United States Patent [19]

Morgan et al.

[11] Patent Number: 4,866,719
[45] Date of Patent: Sep. 12, 1989

[54] SYSTEM AND METHOD FOR PERFORMING ERROR CORRECTION ON STILL FRAME AUDIO TAPE FORMAT VIDEO SIGNALS

[75] Inventors: Donald E. Morgan, Saratoga; Michael B. Shields, San Carlos, both of Calif.

[73] Assignee: Sony Corporation, Tokyo, Japan

[21] Appl. No.: 171,732

[22] Filed: Mar. 21, 1988

[51] Int. Cl.$^4$ .............................................. G06F 11/10
[52] U.S. Cl. ................................... 371/40.1; 358/336; 360/38.1
[58] Field of Search ....................... 371/37, 38, 39, 40; 358/336; 360/38.1

[56] References Cited

U.S. PATENT DOCUMENTS

| | | | |
|---|---|---|---|
| 4,308,557 | 12/1981 | Dieterich | 358/128.5 |
| 4,577,237 | 3/1986 | Collins | 358/336 |
| 4,646,301 | 2/1987 | Okamoto et al. | 371/38 |
| 4,694,456 | 9/1987 | Morita et al. | 371/38 |

Primary Examiner—Charles E. Atkinson
Attorney, Agent, or Firm—Limbach, Limbach & Sutton

[57] ABSTRACT

A system and method for performing error correction on an SFAT format video signal which has been encoded using an error correction code ECC2, and generating a video signal reconstructed from the error-corrected input signal. The error code preferably is a cross interleave Reed-Solomon code. In a preferred embodiment, the system is capable of reconstructing the output video signal so that it has either SFA or SFAT format. Since an SFAT signal includes duobinary encoded data in its active video areas, and thus may be doubly error encoded using two error correction codes (ECC1 and ECC2), the invention is capable of generating from such a doubly encoded signal an ECC1 error-encoded video signal, in SFA (or SFAT) format, which has been error-corrected using error code ECC2. This capability is particularly advantageous where the invention is embodied in a video disk mastering system or method. In a preferred embodiment, the invention also determines the error rate of the input signal and generates a report signal indicative of the input signal's detected error rate. A preferred embodiment of the invention performs both error correction and error detection on-line, in real time, and automatically.

20 Claims, 22 Drawing Sheets (PRIOR ART)
FIG.7

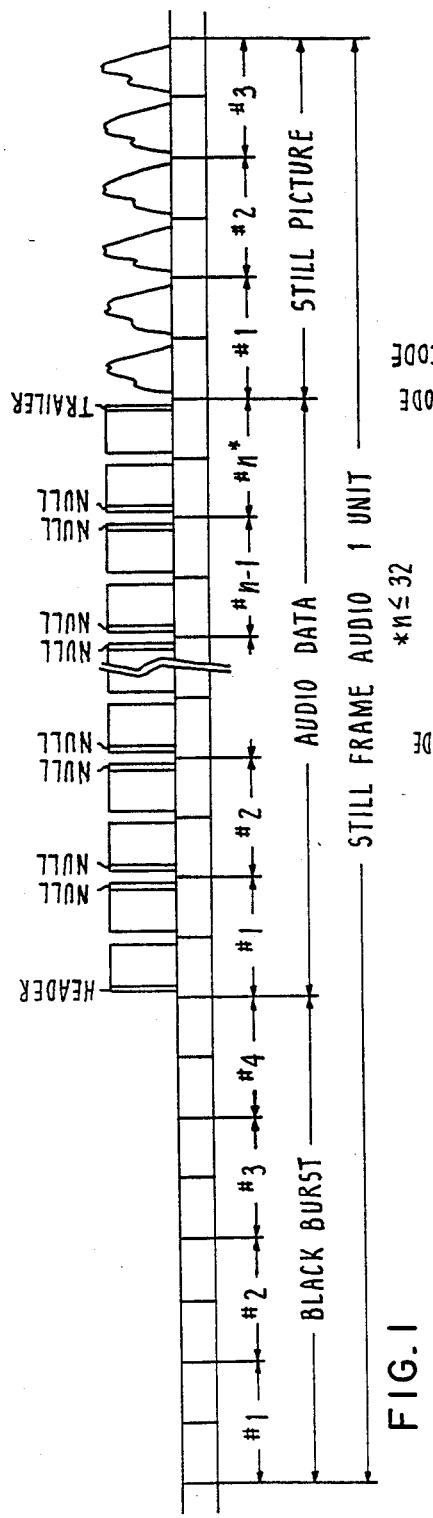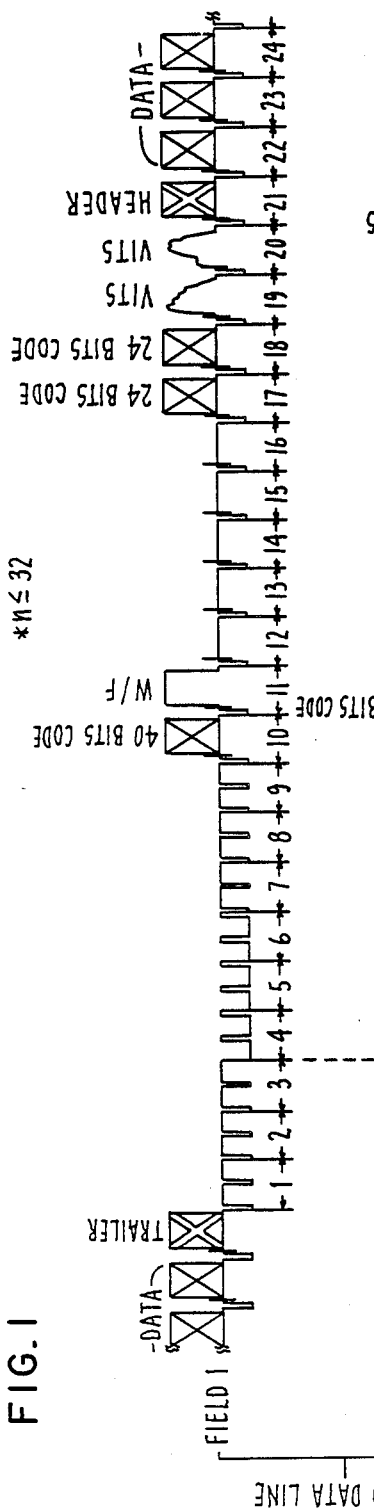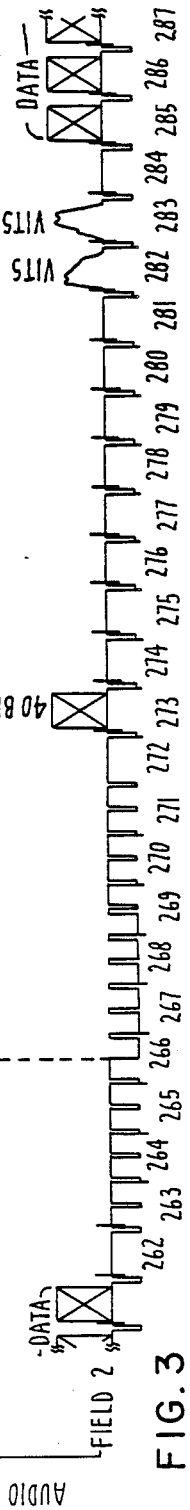
FIG. 1
FIG. 3

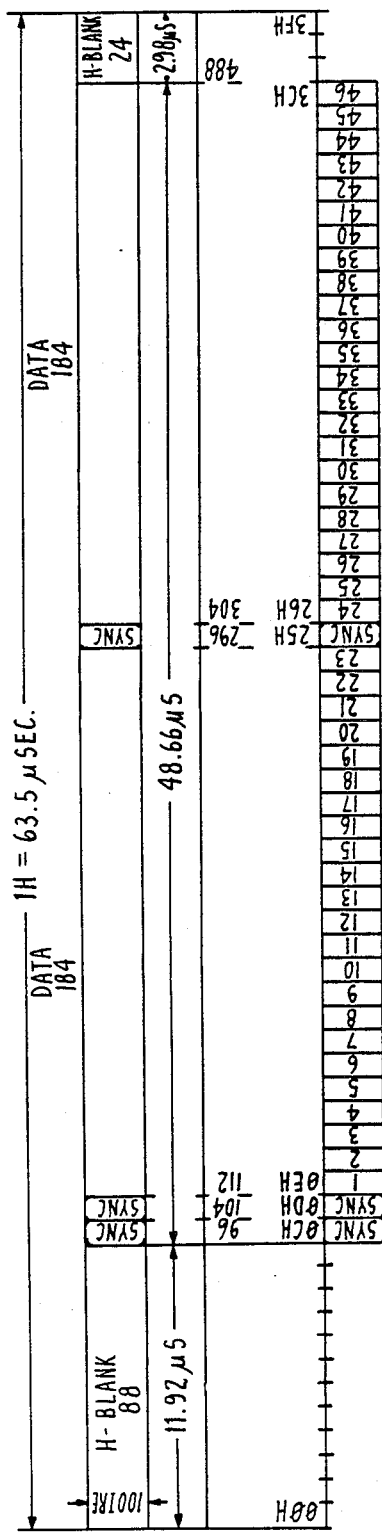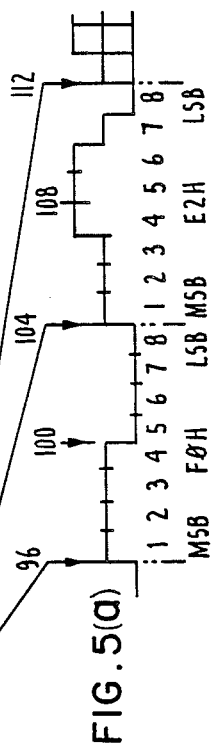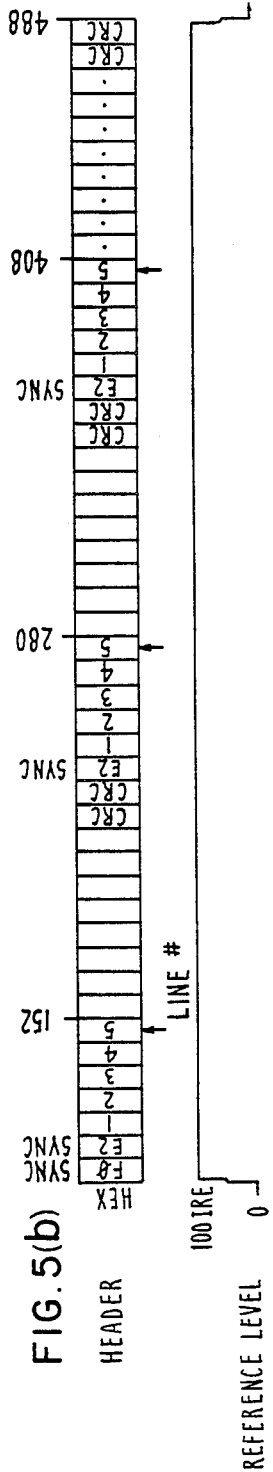
FIG. 5
FIG. 5(a)
FIG. 5(b)

CIRC CALCULATOR BLOCK DIAGRAM

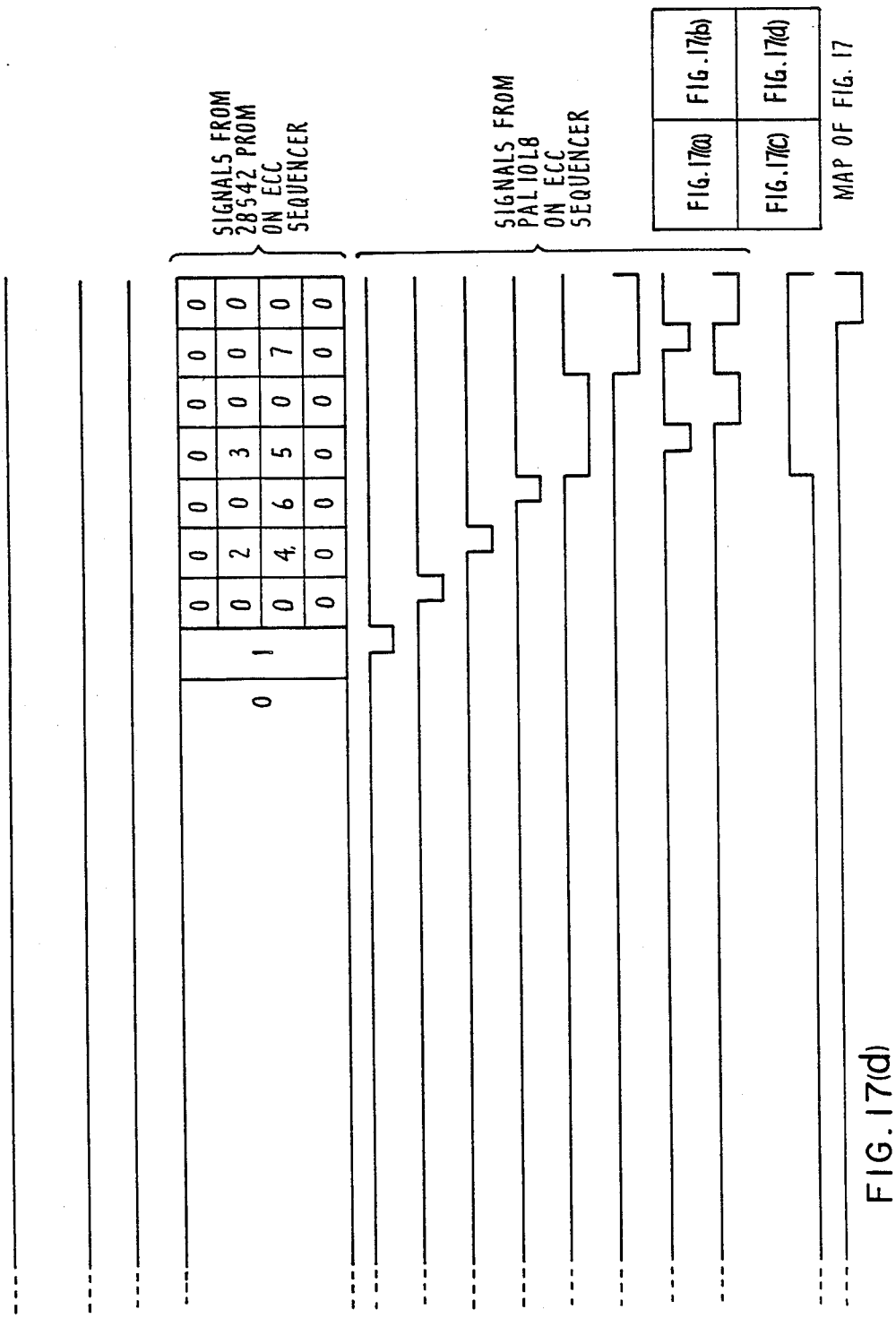

SYSTEM AND METHOD FOR PERFORMING ERROR CORRECTION ON STILL FRAME AUDIO TAPE FORMAT VIDEO SIGNALS

FIELD OF THE INVENTION

The invention relates to systems and methods for performing error correction on video signals encoded with digital data in still frame audio tape ("SFAT") format. More particularly, the invention relates to video disk mastering methods and systems capable of performing error correction on video signals encoded with digital data in still frame audio tape format.

BACKGROUND OF THE INVENTION

Conventional techniques exist for encoding digital data in the active video areas of video signals having either the NTSC format (525 lines per frame, with field rate equal to 60 Hz) or the PAL format (625 lines per frame, with field rate equal to 50 Hz). In one class of such conventional techniques, audio signals are digitized and encoded in still frame audio ("SFA") format, or still frame audio tape ("SFAT") format, in the active video areas of a video signal. Alternatively, digital data other than digitized audio signals may occupy the active video areas of an SFA or SFAT signal.

The SFA format will be described with reference to FIGS. 1 through 4. The SFAT format will be described with reference to FIGS. 1, 5, and 6.

FIG. 1 represents a block of SFA or SFAT data. The data block of FIG. 1 occupies not more than 39 frames of a standard NTSC or PAL video signal. A black burst signal occupies the first four frames of the data block. The next n frames (where n is an integer greater than or equal to two and less than or equal to thirty-two) comprise digitized encoded audio data. Each such frame includes 7.2 kilobytes of data. If a still picture is to be displayed during playback of the audio signal, the final three frames of the data block comprise a conventional still picture video signal. A header code is recorded at the beginning of the first audio data frame (frame 5 in FIG. 1), and a trailer code is recorded at the end of the last audio data frame. In order to play back a series of recorded data blocks of the type shown in FIG. 1, an appropriately programmed computer system is typically employed to ensure that the audio data is reproduced in the proper sequence and is matched with the proper images.

The format of a single frame of SFA encoded audio data will be described with reference to FIGS. 2 and 3. Although the frame shown in FIGS. 2 and 3 is an NTSC implementation of a frame of SFA encoded data, the PAL implementation is very similar, and the differences between the PAL and NTSC implementations will be apparent from the following discussion. The audio data in an SFA frame occupies two fields. As shown in FIG. 2, in the NTSC implementation each field comprises 240 lines. Each line contains 15 bytes of SFA encoded audio data, so that a total of 3600 bytes of encoded audio data occupy each field. The audio data occupying each field has been digitized (typically with 12 bit resolution, at a sampling rate of 8 kHz) and then subjected to an adaptive differential pulse code modulation process (typically with 4 bit resolution, at a sampling rate of 8 kHz). FIG. 3 shows the first 20 lines of the FIG. 2 frame, and the lines numbered 262 through 284 between the two fields of the FIG. 2 frame. Line 21 is reserved for the header, and line 525 is reserved for the trailer. A white flag signal occupies line 11, forty bits of code occupy each of lines 10 and 273, and twenty-four bits of code occupy each of lines 17 and 18.

FIG. 4 represents a single line comprising one of the fields of an NTSC implementation of a frame of SFA encoded data. The first (left-most) 10.725 microsecond interval of the line includes the horizontal synchronization signal shown in FIG. 4. Digitized, binary encoded audio data (or other binary encoded digital data) occupy the next 50.84 microsecond interval of the line. The final 1.97 microsecond interval consists of a signal having substantially zero IRE amplitude.

FIG. 5 shows a line of SFAT data. The first (left-most) 11.92 microseconds represent the horizontal blanking interval. Two 8-bit synchronization bytes occupy the next 16 bits (approximately the next 2 microseconds) of the line. The first of these synchronization bytes is known as "F0H" and has the form shown in FIG. 5(a). The second of these synchronization bytes is known as "E2H" and has the form shown in FIG. 5(a). The next 184 bits of the line (from bit 112 to bit 296) comprise duobinary encoded audio data. The next byte (from bit 296 to bit 304) is another "E2H" synchronization byte. The next 184 bits (from bit 304 to bit 488) comprise duobinary encoded audio data. The final 24 bits of the line comprise a horizontal blanking signal.

A block of SFAT data has the overall arrangement shown in FIG. 1. Unlike a block of SFA data, however, five header lines are provided at the start of the first frame of still frame audio data in a block of SFAT data. In contrast, in an SFA data block, only one header line is provided at the start of the first frame of still frame audio data.

FIG. 5(b) is an example of one of the five header lines which occupy the first frame of encoded audio data in a block of SFAT data. The first (left-most) 11.92 microseconds of the header line represent the horizontal blanking interval, as in the data line shown in FIG. 5. Two eight-bit synchronization bytes occupy the next sixteen bits (the next 2 microseconds) of the header line. The first of these synchronization bytes is an "F0H" byte and has the form shown in FIG. 5(a). The second of these synchronization bytes is an "E2H" byte and has the form shown in FIG. 5(a). The next 40 bits of the header line (from bit 112 to bit 152) comprise a five-byte identification code. Following the next 64 bits, there are two eight-bit cyclic redundancy check (CRC) codes and another eight-bit "E2H" synchronization code. After this "E2H" code, the next 40 bits (bits 240 through 280) comprise a second five-byte identification code. Then, after the next 64 bits, there are two eight-bit CRC codes, followed by an eight-bit "E2H" code, in turn followed by a third five-byte identification code (occupying bits 368 through 408). Finally, after the next 64 bits, there is a final pair of eight-bit CRC codes, followed by 2.98 microseconds of horizontal blanking signal as in the data line shown in FIG. 5.

The format of a single frame of SFAT encoded audio data will be described with reference to FIG. 6. Each line shown in FIG. 6 is identified by two line numbers, one (in the right column of line numbers) corresponding to an NTSC implementation of the SFAT format, and the other (in the left column of line numbers) corresponding to a PAL implementation of the SFA format. The audio data in an SFAT frame occupies two fields. In the NTSC implementation, the first field comprises 238 lines the second field comprises 242 lines. In the PAL implementation, each field comprises 240 lines. The five lines immediately preceding the first field of data (lines 20 through 24 in the NTSC implementation, and lines 26 through 30 in the PAL implementation), are reserved for headers (each having format as shown in FIG. 5(b). In both the PAL and NTSC implementations, the data occupying each field is grouped into three data blocks. For example, in the PAL implementation, the data occupying lines 31 through 110 (or lines 339 through 418) comprises a first block; the data occupying lines 111 through 190 (or lines 419 through 498) comprises a second block; and the data occupying lines 191 through 270 (or lines 499 through 578) comprises a third block.

Since the data occupying the active video areas of an SFAT frame is duobinary encoded, the data may be encoded twice, using two conventional error correction codes ECC1 and ECC2. This is in contrast with data occupying the active video areas of a frame of SFA data, which may practically be encoded only once, using a conventional error correction code ECC1.

In the process of video disk manufacturing, it is conventional to generate a master video tape on which SFA encoded audio signals (or other SFA encoded digital data) are recorded. An error correction code (ECC1) employed to encode the data in the active video areas of the recorded signal facilitates assessment of the quality of the master video tape, in a manner to be described with reference to FIG. 7.

In the conventional video disk manufacturing system of FIG. 7, an SFA format video signal having digitized audio data or other digital data in its active video areas is encoded using error correction code ECC1 in encoding unit 1, and the encoded signal emerging from unit 1 is recorded on video tape in SFA format in mastering tape unit 2. Within quality check unit 3, the master video tape produced in unit 2 (which has SFA format) is played in a video tape player equipped with a conventional SFA decoding unit (such as a DB-2040 video disk decoding board, available from Sony Corporation). The decoding unit employs the error correction code ECC1 in a conventional manner to determine the error rate for each block of SFA-encoded data recorded on the master tape. If the error rates are sufficiently low, the master tape is passed to disk replication unit 4. In unit 4, the information on the master tape is transferred to a video disk in SFA format. This information, in SFA format, may be recovered from the disk by a conventional video disk player equipped with a conventional SFA decoding unit 5 (which may be of the same type as is included in quality check unit 3).

Conventional SFA decoding units 5 are capable of employing the ECC1 code of an SFA-encoded signal to correct errors introduced during the combined tape mastering, quality assessment, and disk replication processes performed in units 2, 3, and 4.

A disadvantage of the conventional video disk mastering technique described with reference to FIG. 7 is that the quality assessment operation inherently adds wear and tear to the master tape during playback in unit 3, and so itself contributes to error creation though it is intended to quantify the errors introduced during production of the master video tape.

SUMMARY OF THE INVENTION

The invention is a system and method for processing an SFAT format video signal which has duobinary digital data in its active video areas. In a preferred embodiment, the digital data has been doubly encoded using two error correction codes (ECC1 and ECC2), and the invention performs error correction on the doubly error encoded SFAT input signal using code ECC2, and outputs a video signal reconstructed from the error-corrected input signal. In one variation on this preferred embodiment, the output signal has SFA format. In another variation on this preferred embodiment, the output signal has SFAT format.

In a preferred embodiment, the invention modulates the output video signal so that it has either SFA or SFAT format. If the output signal of this preferred embodiment is to be recorded on a video disk, the invention produces an output signal having SFA format. If the output signal of this preferred embodiment of the invention is to be recorded on a video tape (for example, as an input signal for a tape-to-tape dubbing process), the invention produces an output signal having SFAT format. Where the input signal has been doubly error encoded using two error correction codes (ECC1 and ECC2), the invention is capable of generating from such doubly encoded input signal an SFA format, ECC1 error-encoded video signal, which has been error-corrected using error code ECC2. This capability is particularly advantageous where the invention is embodied in a video disk mastering system or method. The invention is also capable of generating (from such a doubly error-encoded SFAT input signal) a doubly error-encoded, SFAT format video signal, which has been error-corrected using error code ECC2.

In a preferred embodiment, the invention also performs error detection, and generates a signal indicative of the input signal's detected error rate. A preferred embodiment of the invention performs both error correction and error detection on-line, in real time, and automatically.

DESCRIPTION OF THE DRAWINGS

FIG. 1 is a graph of a video signal having SFA format, and comprising several frames of data.

FIG. 3 is a graph of some of the lines comprising the frame shown in FIG. 2.

FIG. 5 is a single line of a video signal having SFAT format.

FIG. 5(a) represents two synchronization bytes comprising the FIG. 5 signal.

FIG. 5(b) is a portion of a specific type of video signal, having the line format shown in FIG. 5, and known as a header line of an SFAT frame.

DETAILED DESCRIPTION OF THE PREFERRED EMBODIMENT

Figure 8:
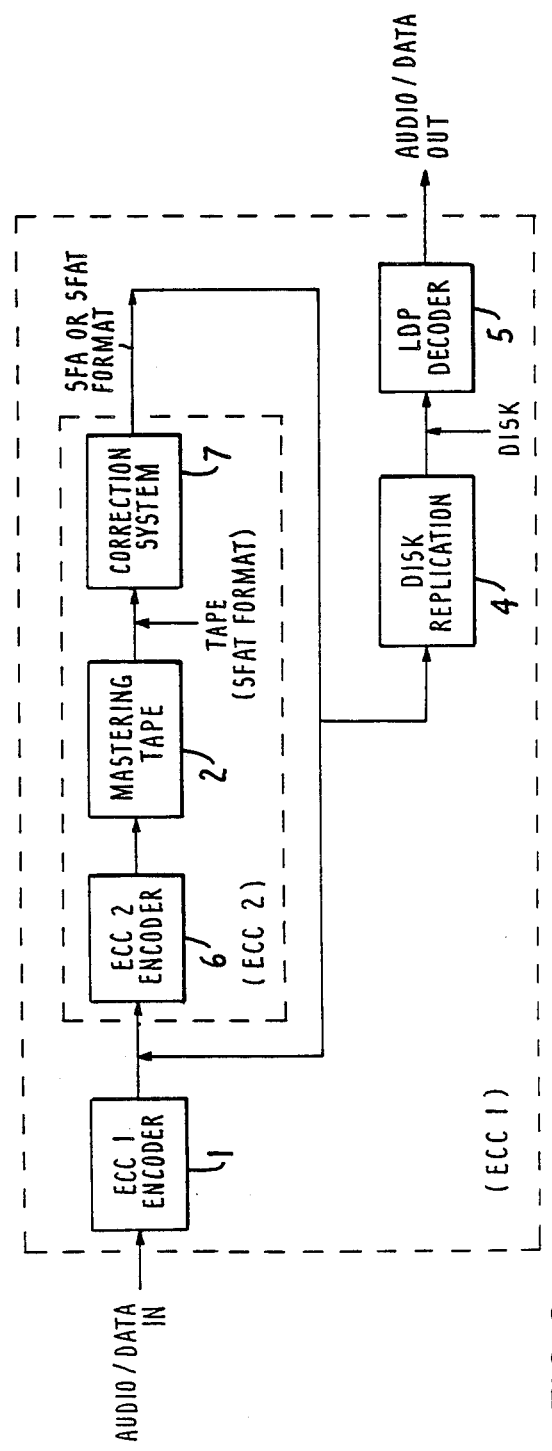
FIG. 8 is a block diagram of a video disk mastering system embodying the invention.

FIG. 8 is a block diagram of a video disk mastering system embodying a preferred embodiment of the invention. An SFAT format video signal having duobinary encoded audio information or other duobinary digital data in its active video areas is encoded using a first conventional error correction code (ECC1) in encoding unit 1. The encoded signal emerging from unit 1 is then encoded using a second conventional error correction code (ECC2) in encoding unit 6. The signal emerging from encoding unit 6 contains an "inner" layer of error correction code (ECC1) and an "outer" layer (ECC2). The "inner" layer remains with the data throughout the video disk mastering process, in the sense that ECC1 encoded data is ultimately recorded in SFA format on the video disk. Although the "outer" layer is added for the purpose of correcting tape-induced errors that arise during video disk mastering, the SFA format data ultimately recorded on a video disk is not ECC2 encoded data.

Figure 2:
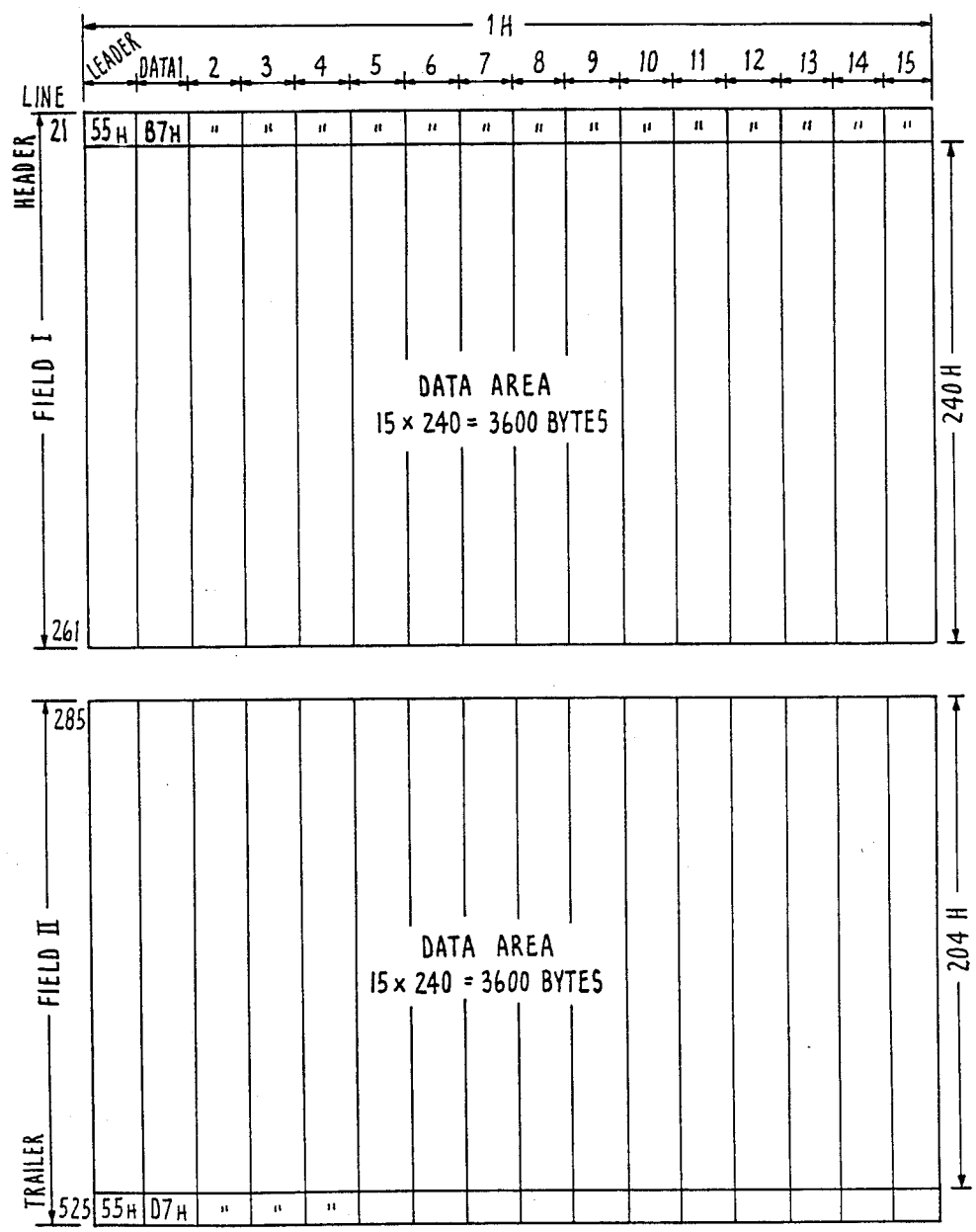
FIG. 2 is a single frame (including 525 lines) of a video signal having SFA format.
Figure 4:
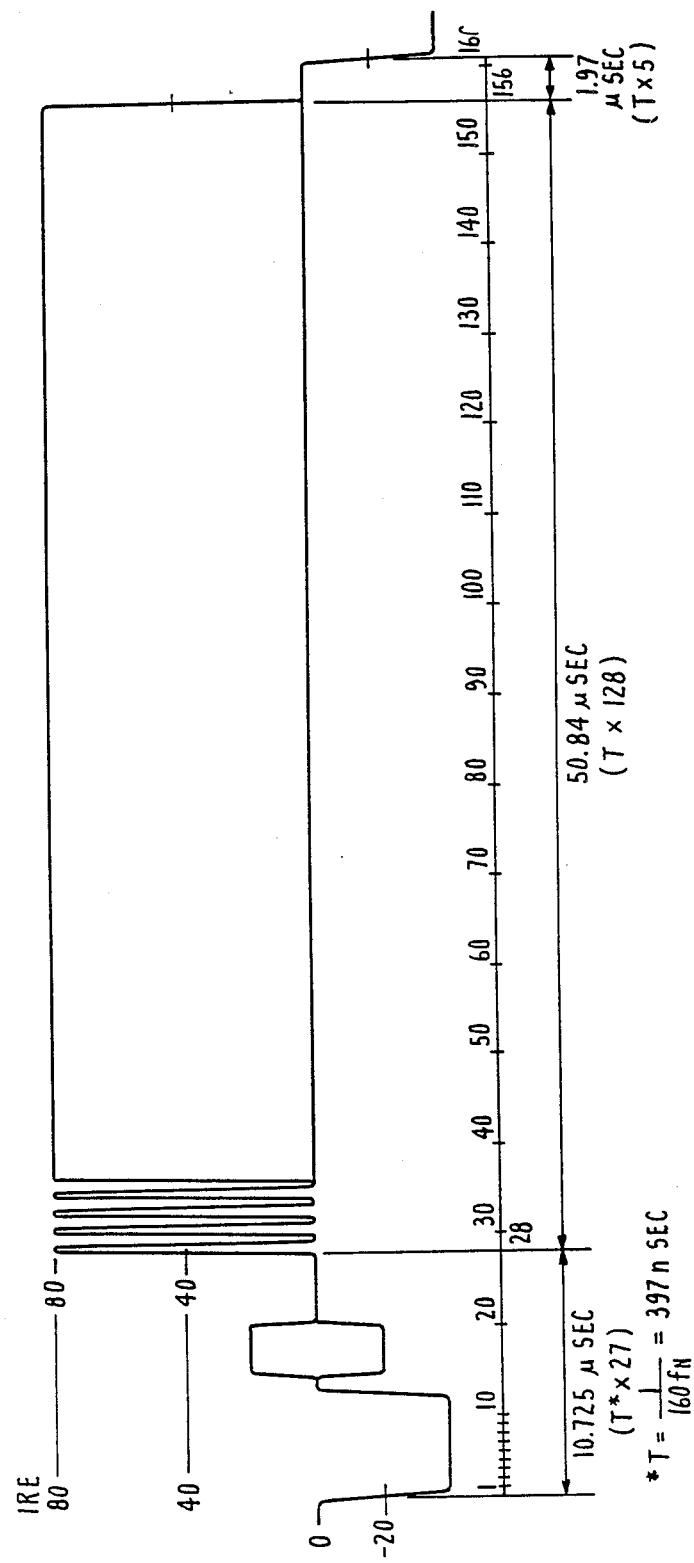
FIG. 4 is a graph of a single line of a video signal having SFA format.
Figure 6:
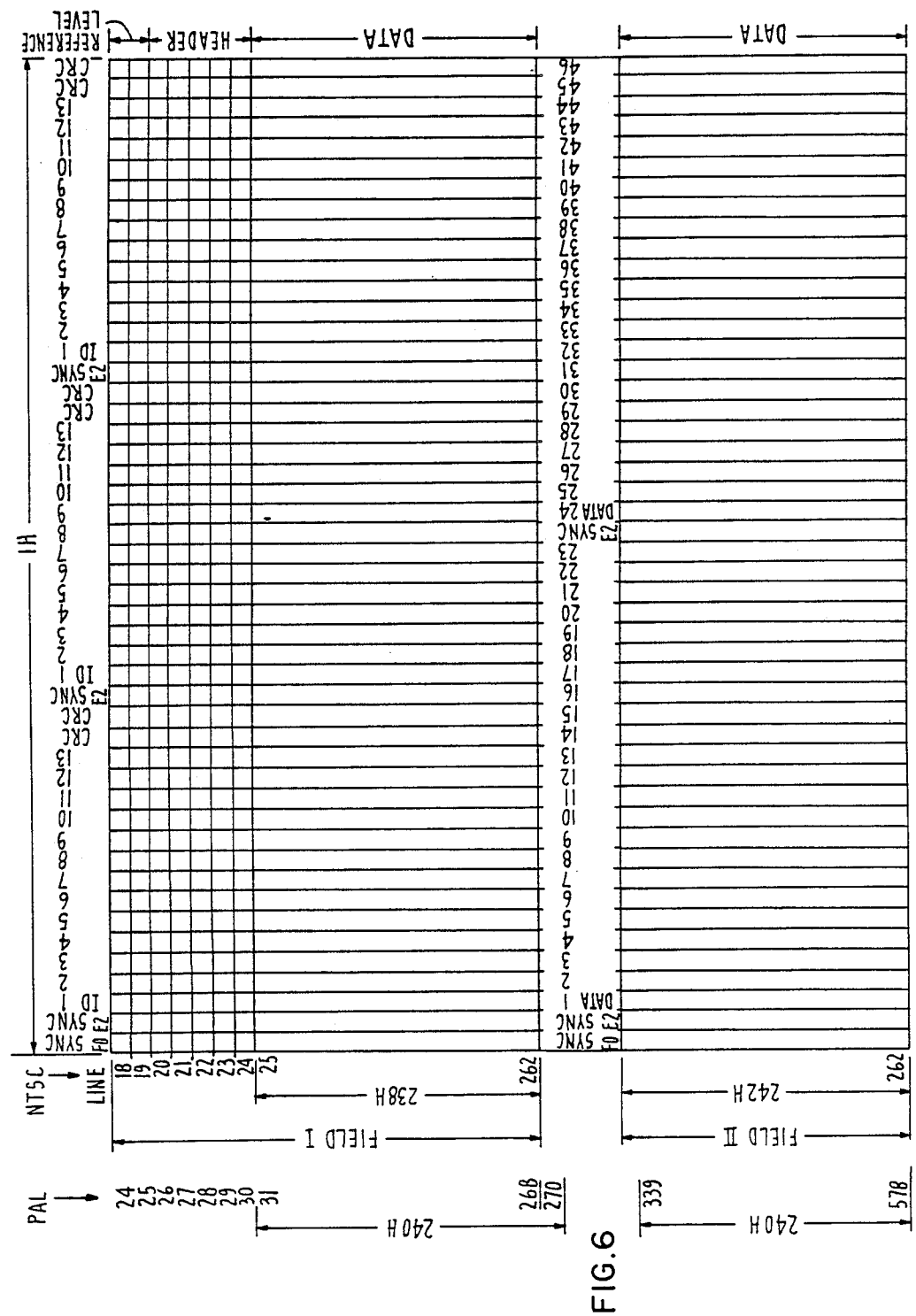
FIG. 6 is a single frame of a video signal having SFAT format.
Figure 7:
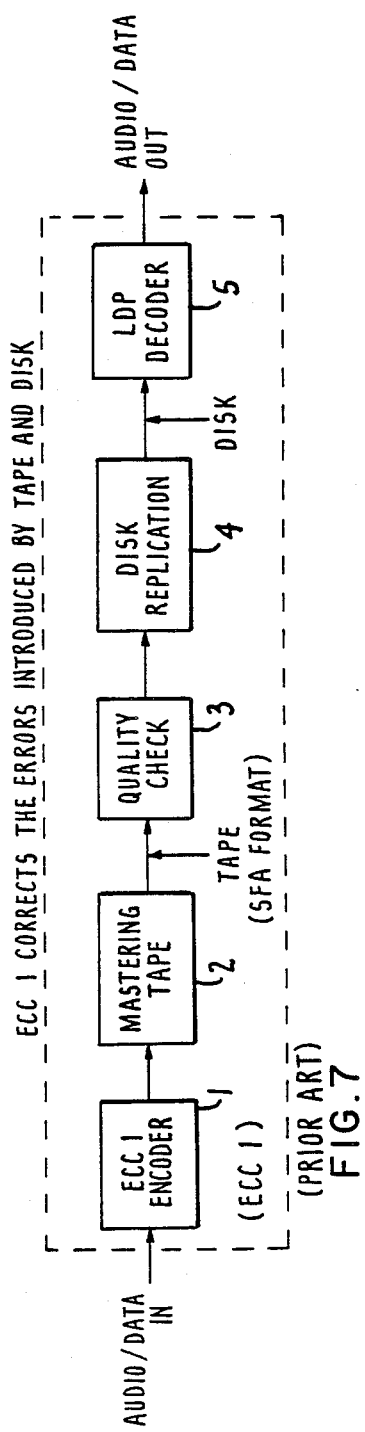
FIG. 7 is a block diagram of a conventional video disk mastering system.

In a preferred embodiment, ECC1 is a Cross Interleave Reed-Solomon code and ECC2 is also a Cross Interleave Reed-Solomon code. An encoding unit suitable for use as encoding unit 1 or 6 may be selected from those well known in the art, such as those of the type described in U.S. Pat. No. 4,680,764, issued July, 14, 1987 to Suzuki, et al. The twice encoded signal emerging from unit 6 is recorded on video tape in SFAT format in mastering tape unit 2. The video tape produced in unit 2 is then supplied to correction system 7 (sometimes referred to herein as "correction box" 7), in which it is replayed. The replayed video signal is demodulated, and the error correction code ECC2 is employed to detect and correct errors in the data occupying the signal's active video areas that were introduced in tape mastering unit 2. Correction system 7 may be operated in a mode in which it will then convert the error corrected data into an SFA format video signal, and then supply the error corrected SFA video signal to disk replication unit 4. In unit 4, the error corrected SFA format video signal (which preferably is singly error encoded, using error code ECC1 alone) is recorded on a video disk. The digital information recorded on the video disk may then be recovered from the disk in a conventional video disk player equipped with conventional SFA decoding unit 5 of the same type discussed with reference to FIG. 7.

Alternatively, correction system 7 may be operated in a mode in which it will convert the error corrected data into an SFAT format video signal. The error corrected SFAT video signal emerging from correction system 7 (which preferably is doubly error encoded using both error codes ECC1 and ECC2) may be returned to encoding unit 6 for encoding and subsequent re-recording on video tape in unit 2 (for example, as part of a tape-to-tape dubbing process). Alternatively, the error corrected SFAT video signal emerging from correction system 7 may be directly recorded on video tape or used for any other desired purpose.

Figure 9:
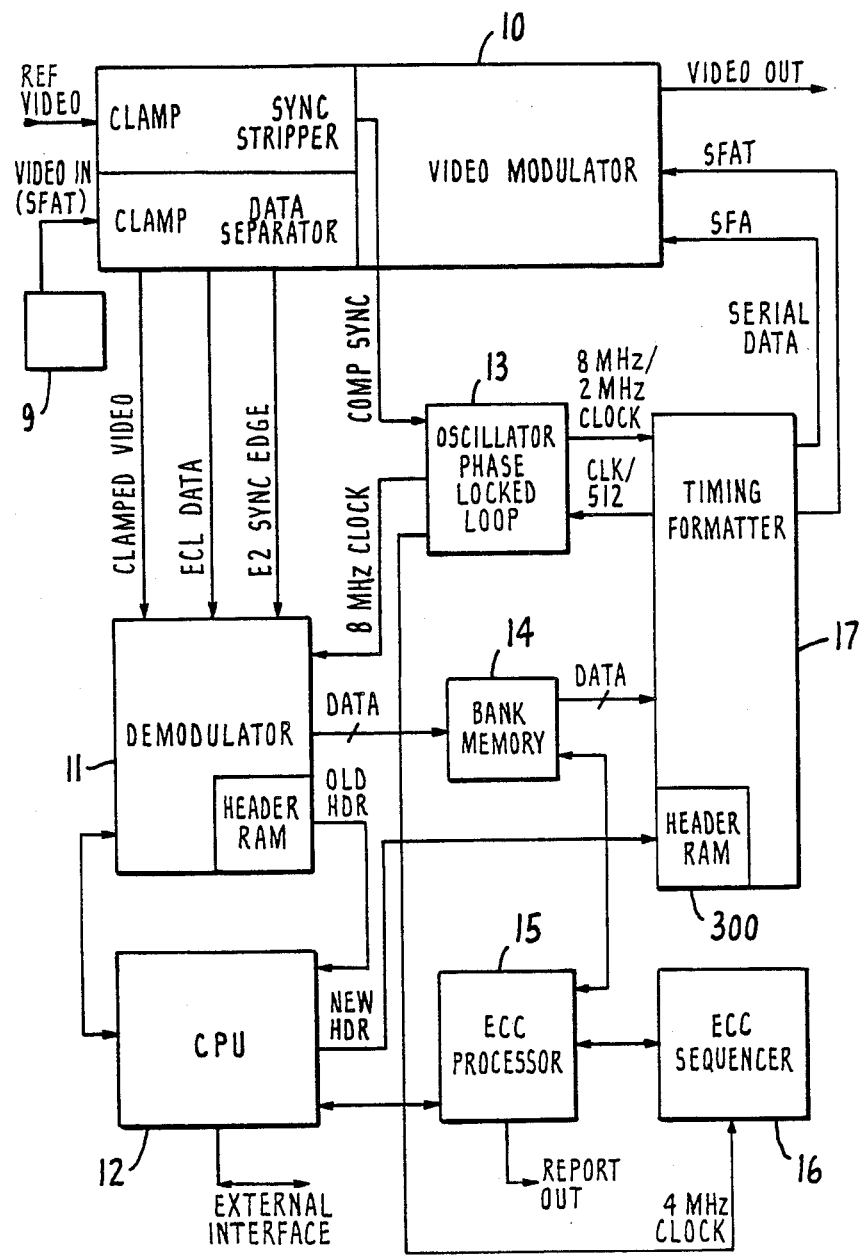
FIG. 9 is a block diagram of a preferred embodiment of the correction circuit of the invention.

FIG. 9 is a block diagram of a system according to the invention, which is suitable for use as correction box 7 in the FIG. 8 system. An SFAT format video signal (identified as "VIDEO IN") is supplied to video modulator unit 10. In a preferred embodiment, the VIDEO IN signal will have been recorded on a video tape (such as conventional one inch wide, C format tape used for video disk mastering), so that the VIDEO IN signal supplied to unit 10 will be the output of conventional video tape playback unit 9. In unit 10, the signal VIDEO IN is clamped, buffered, and supplied to demodulator unit 11. Unit 10 also processes the VIDEO IN signal to separate out the duobinary encoded information (which may be duobinary encoded audio information or other digital data) in its active video areas and convert this digital information into an ECL (emitter-coupled logic) data stream. Unit 10 then supplies this serial ECL data stream to demodulator unit 11 (to be described below). Unit 10 also detects the synchronization byte E2H associated with the beginning of each line of the SFAT encoded data, and supplies an E2 SYNC EDGE signal identifying the center of the zero crossing portion of this synchronization byte to demodulator unit 11.

In demodulator unit 11, the serial ECL data from unit 10 is converted into a stream of serial TTL data, which is then converted into parallel form, and in response to control signals from CPU 12 is sent to memory unit 14 for storage. A CRC check is performed on each line header of the SFAT encoded data, and a report on whether each associated line of data is valid is supplied to CPU 12. Unit 11 also processes the clamped video signal from unit 10 to generate a white reference level signal ("WHITE REF") which is supplied to unit 10 for use in establishing proper slice references for use in the process of recovering the duobinary encoded data from the VIDEO IN signal.

In response to control signals from CPU unit 12, ECC processor 15 determines the error rate in data stored in memory unit 14, and performs error correction on such data. ECC unit 15 employs the conventional error code denoted herein as "ECC2" to process the data. The error corrected data from processor 15 is supplied back to memory unit 14, so that it may be later supplied at an appropriate time to formatting unit 17. When operated in a first mode, unit 17 remodulates the parallel data from memory unit 14 into SFA encoded parallel data, converts the SFA data into a stream of serial SFA data, and supplies the serial SFA data stream to modulator unit 10. When operated in a second mode, unit 17 remodulates the data from memory 14 into SFAT encoded parallel data, converts the SFAT data into a stream of serial SFAT data, and supplies the serial SFAT data stream to unit 17. Formatting unit 17 receives a stabilized clock signal (preferably an 8 MHz or a 2 MHz clock signal from phase locked loop oscillator unit 13. Unit 13 also supplies a stabilized clock signal (preferably an 8 MHz clock signal to demodulator unit 11.

Video modulator unit converts the SFA (or SFAT) format serial data stream from unit 17 into a video signal ("VIDEO OUT") suitable for recording in a video tape recorder or in a video disk replication unit.

Figure 10:
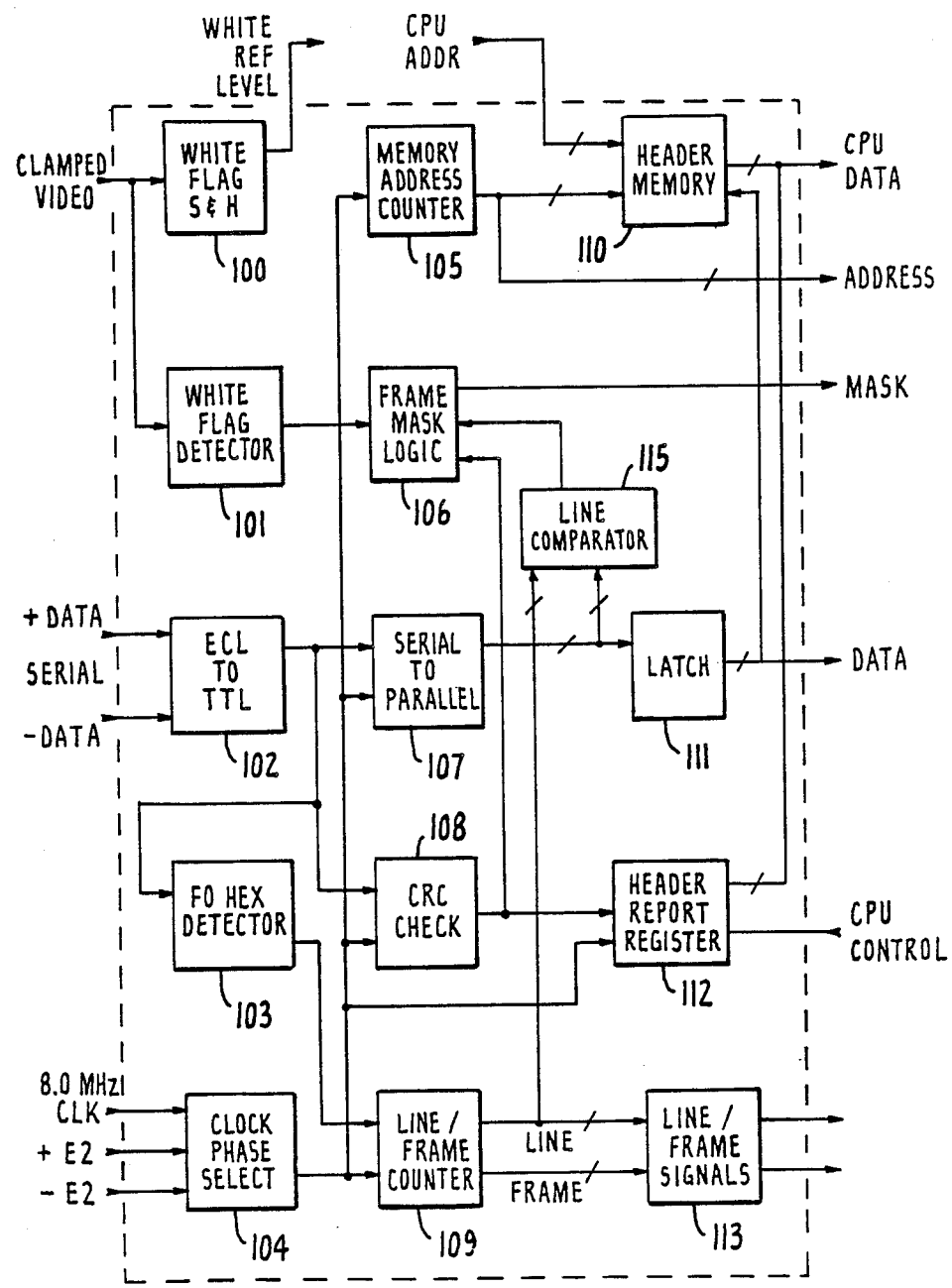
FIG. 10 is a block diagram of the demodulator component of FIG. 9.

FIG. 10 is a block diagram of a preferred embodiment of demodulator unit 11. Demodulator clock phase selection unit 104 receives the E2 SYNC EDGE signal (and its inverse) generated in modulator unit 10 and the clock signal (preferably having frequency 8 MHz). Clock phase selection unit 104 preferably includes a multi-tap active delay line which receives the 8 MHz clock signal and outputs a set of delayed clock signals, each delayed by a different amount. The E2 SYNC EDGE signal identifies the center of the seventh bit (See FIG. 5(a)) of the first E2H synchronization byte in each line of data. Unit 104 employs the E2 SYNC EDGE signal to jam the demodulator clock counter to count number 110 (corresponding to the one-hundred tenth bit of an SFAT encoded line of data) at a time coinciding with receipt of the one-hundred tenth bit of the SFAT encoded line of data, to synchronize the demodulator clock with the SFAT data.

Figure 10A:
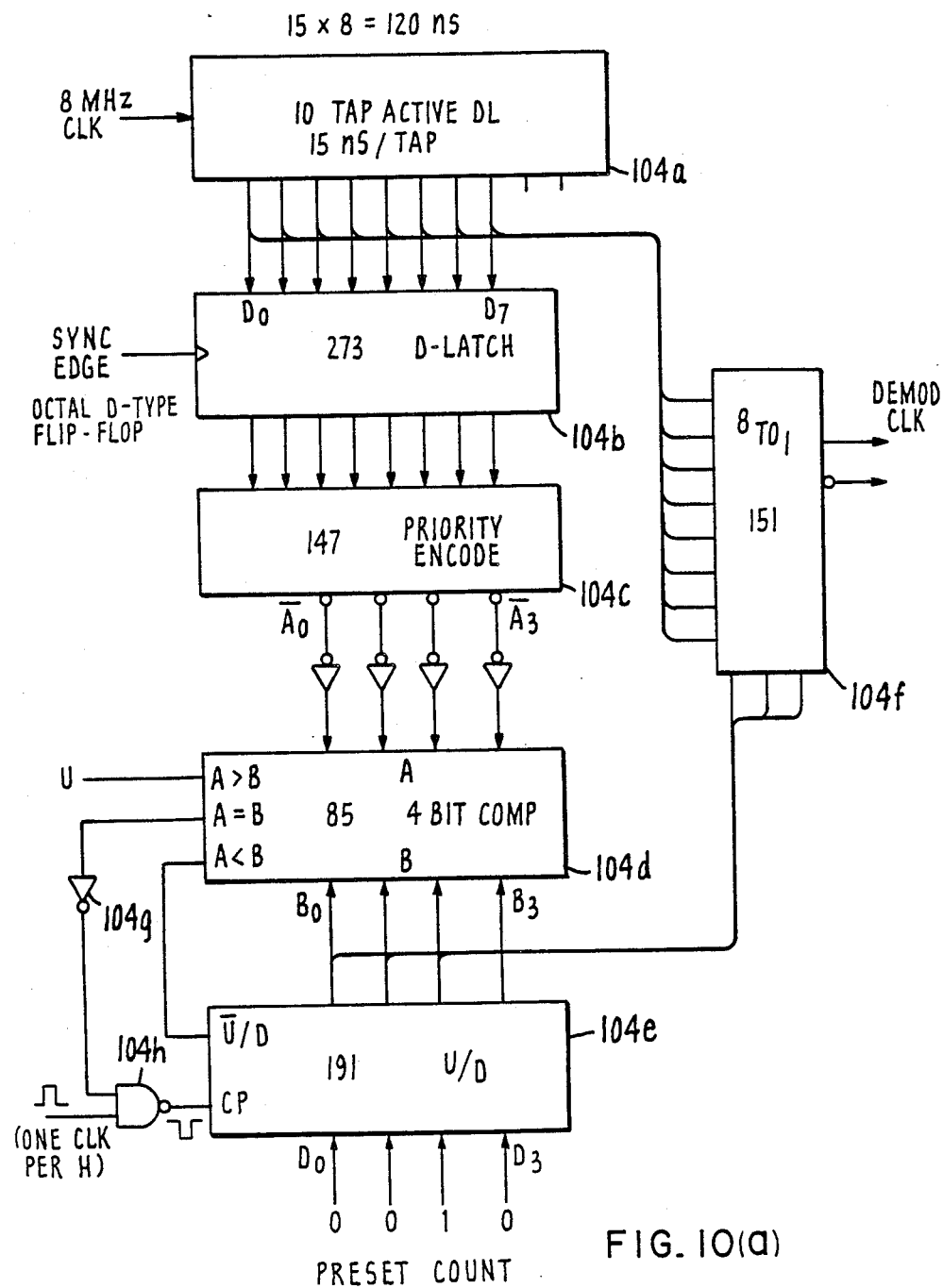
FIG. 10(a) is a circuit diagram of a preferred embodiment of block 104 of FIG. 10.

A preferred embodiment of unit 104 is shown in FIG. 10(a). Ten tap active delay line 104a outputs eight delayed clock signals, with a 15 ns delay per tap, to octal D-type latch circuit 104b and to data selector circuit 104f. Another input to circuit 104b is the E2 SYNC EDGE signal. The output of circuit 104b is supplied to priority encoder circuit 104c. Each of the four bits output from circuit 104c is inverted and then supplied to four-bit magnitude comparator 104d. The output of synchronous up-down counter 104e is also supplied to circuit 104d. Circuit 104e receives the indicated preset count bits $D_0$ through $D_3$. When the two input signals (each having four-bits) to circuit 104d represent the same number, a signal indicative of this condition is sent through inverter 104g to one input of NAND gate 104h. A clock pulse is periodically supplied to the other input of gate 104h with period corresponding to the horizontal line period of the SFAT video signal. The output of gate 104h is supplied to the clock input terminal of circuit 104e as shown. A signal indicative of whether the input to circuit 104d from circuit 104e represents a larger number than does the input from circuit 104c is sent to the up/down input of circuit 104e. Three bits ($B_0$, $B_1$, and $B_2$) of the four bits ($B_0$ through $B_3$) output by counter 104e are supplied to circuit 104f as shown.

The clock signal emerging from unit 104 is supplied to memory address counter 105, serial to parallel converter 107, CRC check unit 108, header report register 112, and line/frame counter 109. Counter 109 also receives signals, derived in F0 Hex detector unit 103 from the TTL serial data emerging from circuit 102, each signal indicating an occurrence of the F0H synchronization byte (described with reference to FIG. 5(a)). Line/frame signal unit 113 receives the line count and frame count signals produced in counter 109. In response to the line count and frame count signals from counter 109, unit 113 generates a "BLOCK STROBE" signal indicating the start of the first of the three data blocks in the first field of a frame of SFAT data. The BLOCK STROBE signals are supplied to ECC sequencer 16 and to memory unit 14.

Memory address counter 105 generates address signals ("ADDRESS") and supplies these to header memory 110 and to CPU 12.

The serial ECL data from modulator 10 is supplied to unit 102, in which it is converted to TTL serial data. The TTL data is supplied from unit 102 to serial-to-parallel converter 107, CRC check unit 108, and F0 Hex detector 103.

The parallel data emerging from circuit 107 are supplied to latch 111, and the parallel data emerging from latch 111 ("DATA") are sent to header memory unit 110 and to memory unit 14 (shown in FIG. 9).

CRC check unit 108 checks the header data of the serial TTL data stream supplied from unit 102, and sends a signal (the inverse of signal "$E_R$") indicative of the data's validity to frame mask logic unit 106 and to header report register 112. A CPU control signal (denoted "CPU CONTROL" in FIG. 10 and "ID ER SMPL" in FIG. 10(b)) from CPU 12 causes register 112 to send to CPU 12 a header report ("CPU DATA") in a format determined by the CPU CONTROL signal.

Figure 10B:
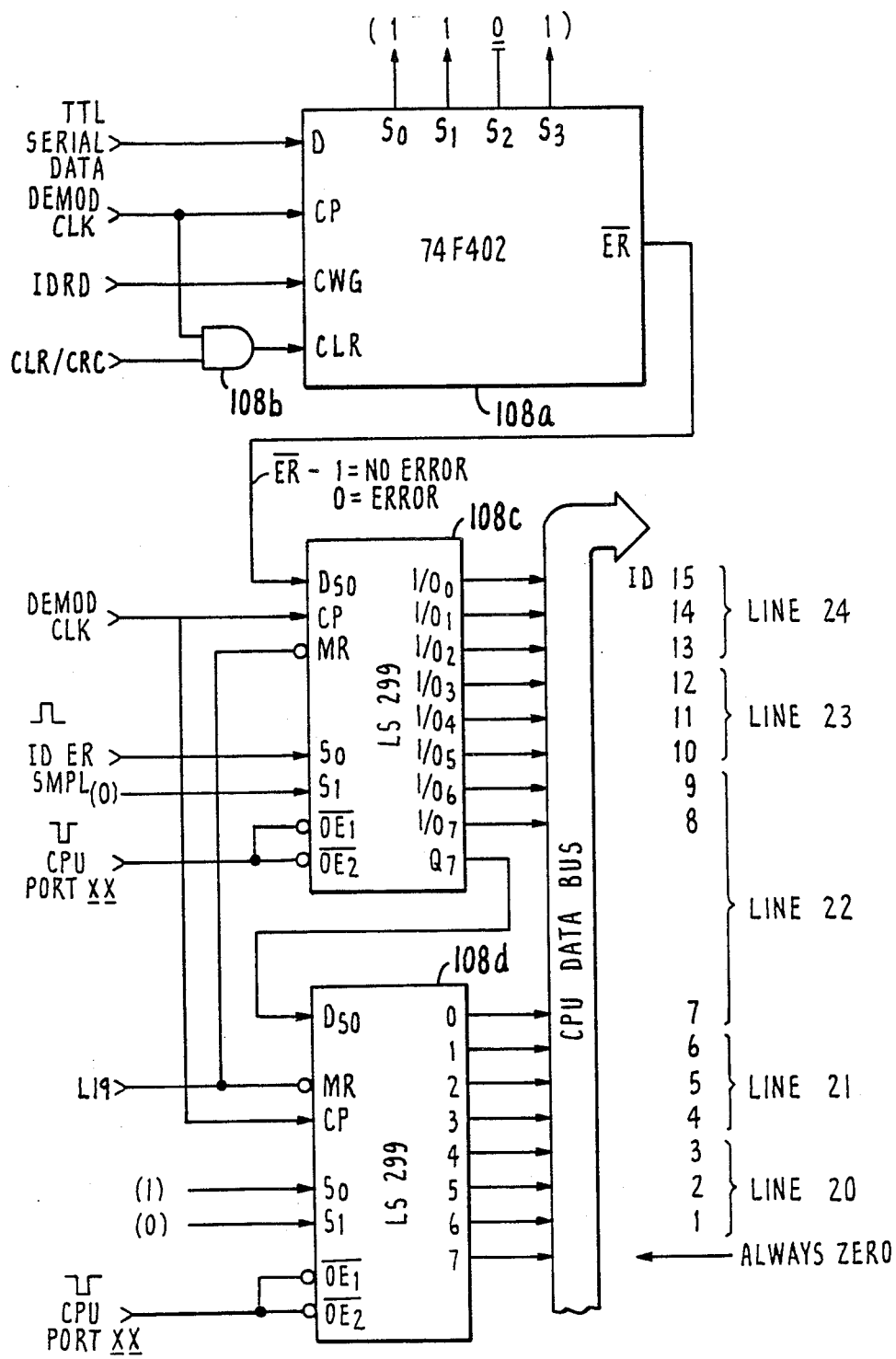
FIG. 10(b) is a circuit diagram of a preferred embodiment of block 108 of FIG. 10.
Figure 10C:
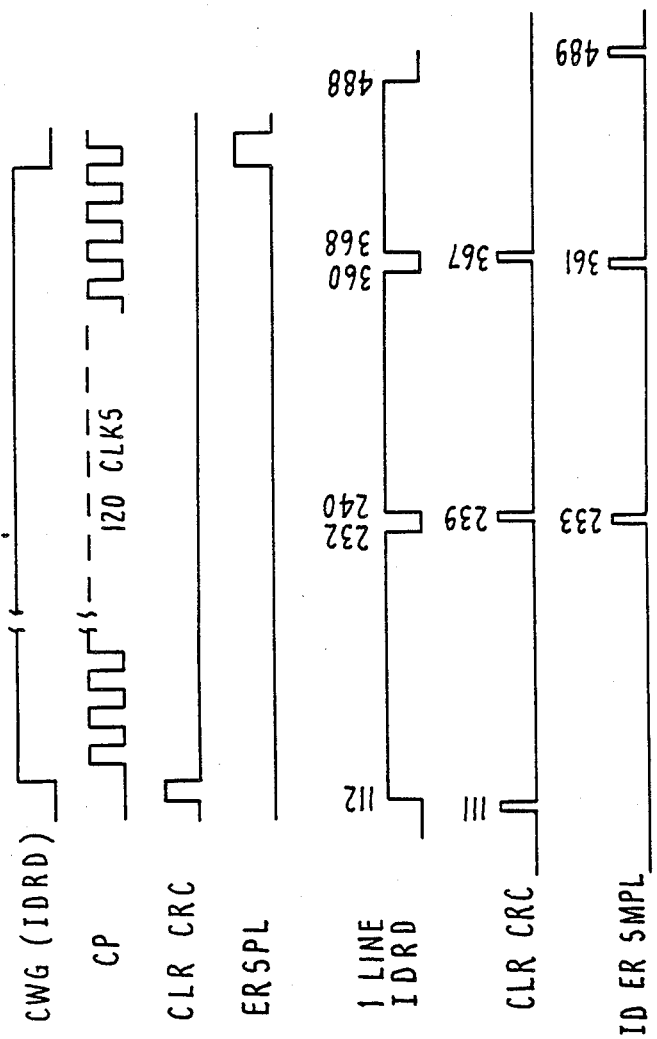
FIG. 10(c) shows the timing relationships of a number of signals processed in the FIG. 10(b) circuit.

FIG. 10(b) is a circuit diagram of a preferred embodiment of CRC check unit 108 and header report register. The CRC check operation is performed in a conventional manner in integrated circuit 108a, which is preferably a 74F402 circuit. The error signal (the inverse of signal ER) generated in circuit 108a as the result of this operation is a logical "one" if no error is detected, and a logical "zero" if an error is detected. This error signal is supplied to storage register 108c, which is coupled as shown to storage register 108d. Each of registers 108c and 108d is preferably an LS299 integrated circuit. FIG. 10(c) shows the timing relationships of various ones of the signals processed in the FIG. 10(b) circuit.

Circuit 100 samples and holds the White Flag signal which occupies lines 18 and 19 of each frame of the clamped SFAT video signal received from modulator 10. The WHITE REFERENCE signal emerging from circuit 100 is supplied to circuit 200 of modulator 10.

When white flag detector 101 detects the occurrence of a valid white flag signal, detector sends an appropriate signal to frame mask logic unit 106. Logic unit 106 also receives signals, supplied from CRC check unit 108, indicative of the result of the data validity check performed in unit 108. Line number comparator unit 115 also supplies a "VALID ID LINE NUMBER" signal to logic unit 106 when the line numbers in the header lines of the parallel data stream emerging from unit 107 (i.e., the line numbers in bytes 151, 279, and 407 of each header line shown in FIG. 5(b)) match the line numbers of the line number clock signal emerging from counter 109.

In accord with the following algorithm, logic unit 106 generates masking signals ("MASK"), and supplies them to CPU 12 for use in generating the new header signals supplied from CPU 12 to header RAM 300 of formatting unit 17. The algorithm is specifically applicable to SFAT signals in the NTSC format, but may be modified in a readily apparent manner to apply to SFAT signals in the PAL format. Lines 1 through 22 of each frame are always masked (or "blanked"). If unit 101 detects a valid white flag signal at lines 18 and 19 of the frame, then lines 23 and 24 of the frame are also masked, and if CRC check unit 108 indicates no data errors, the entire frame is masked. If unit 101 detects no valid white flag in lines 18 and 19, then if CRC check unit 108 indicates no data errors, and line number comparator 115 supplies a VALID ID LINE NUMBER signal to logic unit 106, the entire frame is masked.

ECL to TTL conversion circuit 102 accepts the ECL signal pair (the "DATA" signal and its complement) from circuit 203 of modulator 10, and converts this signal pair to a stream of serial TTL data. A suitable ECL to TTL conversion circuit may be selected from those well known in the art.

Figure 11:
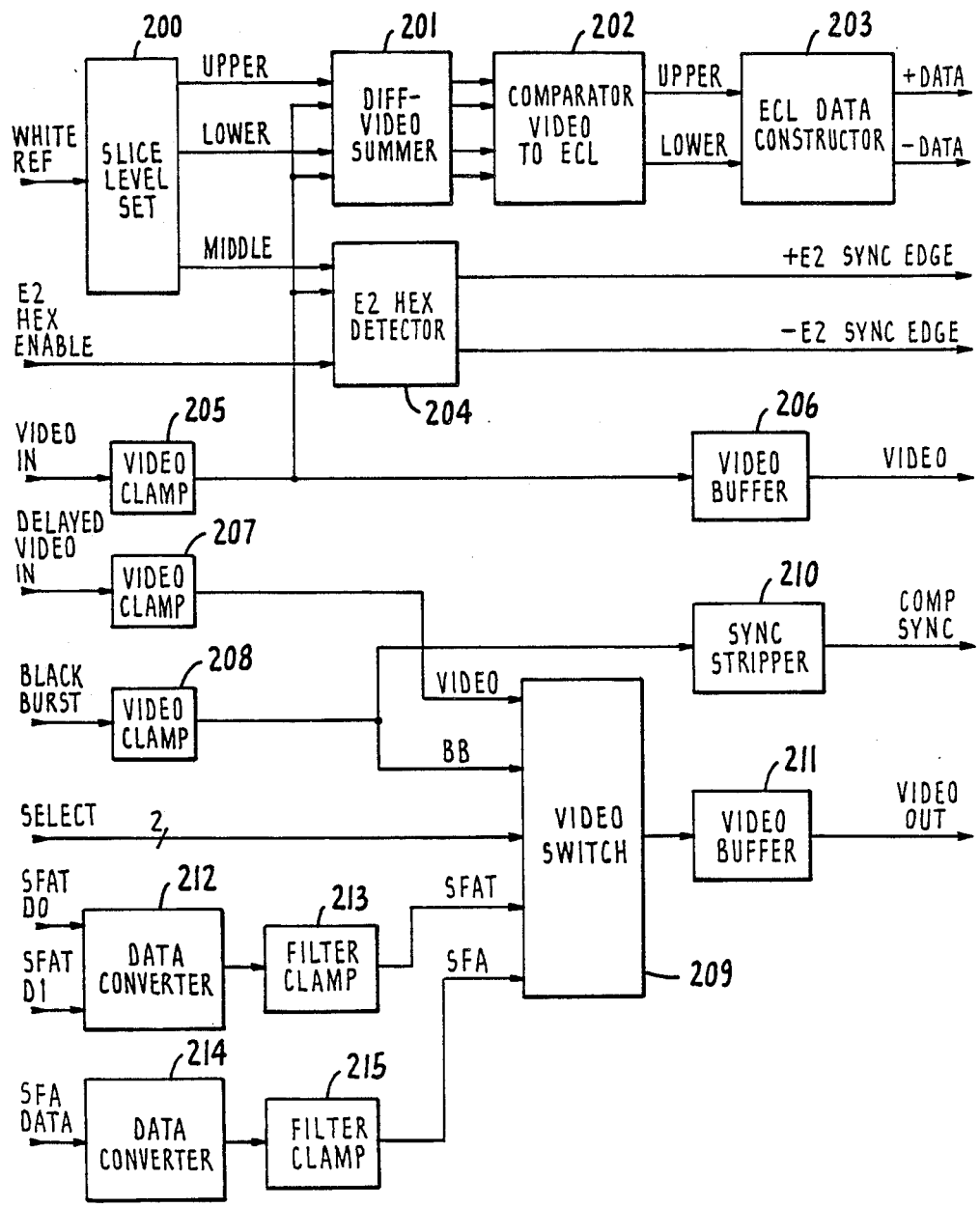
FIG. 11 is a block diagram of the modulator component of FIG. 9.
Figure 11A:
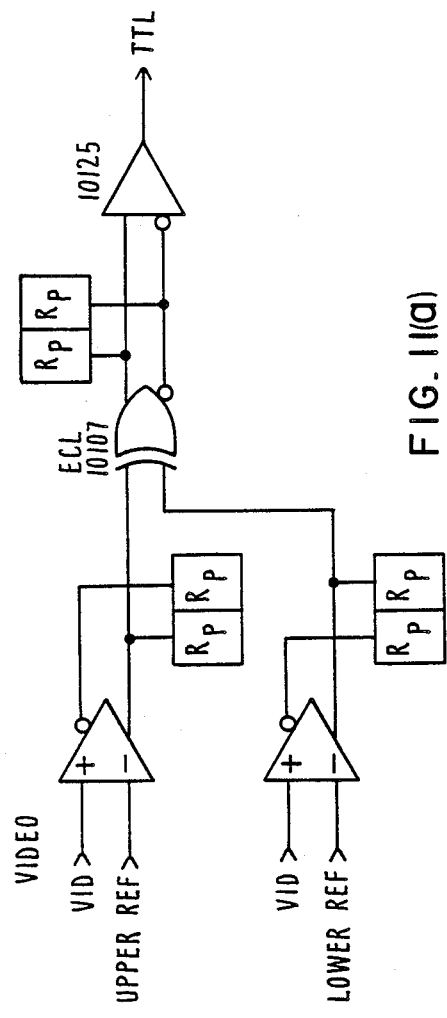
FIG. 11(a) is a circuit diagram of a preferred embodiment of circuit 201 of FIG. 11.

A preferred embodiment of modulator unit 10 is shown in FIG. 11. The video signal from video tape playback unit 9 is supplied to video clamp circuit 205, and a delayed version of this video signal is also supplied to video clamp circuit 207. The clamped video signal emerging from circuit 205 is supplied to circuits 201 and 204, and is buffered in buffer circuit 206 and then supplied to circuits 100 and 101 within demodulator 11. The clamped, delayed video signal from circuit 207, together with a clamped black burst signal ("BLACK BURST" or "BB") from video clamp circuit 208 are supplied to video switch 209. The black burst signal from circuit 208 is also supplied to sync stripper circuit 210, in which it is employed to generate a synchronization signal ("COMP SYNC"). The COMP SYNC signal is then supplied to phase locked loop oscillator unit 13 in which it is employed to generate a stabilized clock signal.

Slice level set unit 200 samples the WHITE REF signal supplied from sample and hold circuit 100 of unit 11 in a conventional manner to establish "Upper" and "Lower" slice voltage references appropriate for use in the process of recovering the duobinary encoded data from the clamped video signal emerging from circuit 205. The Upper and Lower slice references are supplied to summation unit 201. A "Middle" slice voltage reference having a selected intermediate voltage magnitude is also extracted in circuit 200 and supplied to E2 Hex detector unit 204.

Unit 201 is a differential video amplifier with slice offset and dual output. The signals emerging from unit 201 are supplied to comparator 202 and to ECL data constructor circuit 203 in which the Upper slice signals are "Exclusive OR'd" (in an Exclusive OR gate) with the Lower slice signals to produce ECL data. The ECL data signal pair, comprising "+DATA" and its inverse ("−DATA"), emerging from circuit 203 is supplied to demodulator unit 11.

Figure 11B:
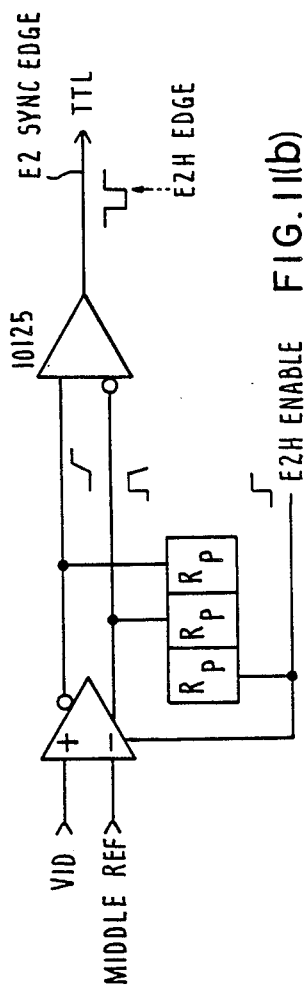
FIG. 11(b) is a circuit diagram of a preferred embodiment of circuit 204 of FIG. 11.

A preferred embodiment of E2 Hex detector unit 204 is shown in FIG. 11(b). The Middle voltage reference from circuit 200 and the clamped video signal from circuit 205 are processed in circuit 204 as follows. Circuit 204's comparator is enabled when E2H is high, so that the E2 SYNC EDGE signal emerging from circuit 204 identifies the center of the seventh bit, shown in FIG. 5(a), of the first E2H synchronization byte in each line of data. Unit 104 employs this E2 SYNC EDGE signal to jam the demodulator clock counter in the manner described above.

Error corrected, duobinary encoded SFAT data generated in formatting unit 17 (in a manner to be described below) are employed to modulate a video carrier wave in data conversion circuit 212, and the video signal emerging from circuit 212 is filtered and clamped in circuit 213, before reaching video switch 209. Similarly, error corrected SFA data generated in formatting unit 17 (in a manner to be described below) are employed to modulate a video carrier wave in data conversion circuit 214, and the video signal emerging from circuit 214 is filtered and clamped in circuit 215, before reaching video switch 209.

In response to selection signal "SELECT," switch 209 will send to video buffer circuit 211 any selected one of the four video signals ("VIDEO," "BB," "SFAT," and "SFA") supplied to switch 209.

Figure 12:
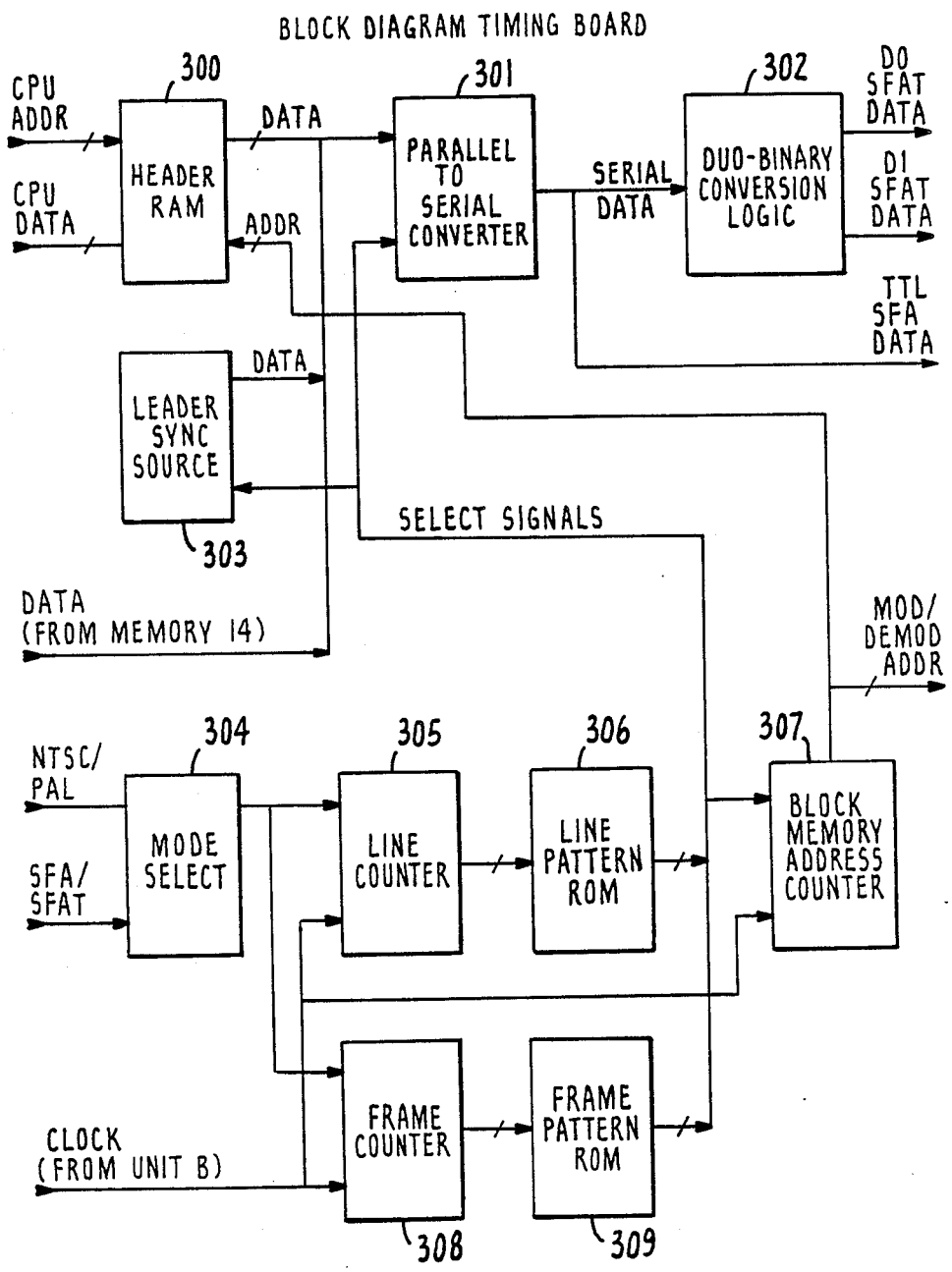
FIG. 12 is a block diagram of the timing board of FIG. 9.

A preferred embodiment of formatting unit 17 of FIG. 9 will next be described with reference to FIG. 12. The selection signals "SFA/SFAT" and "NTSC/PAL" are supplied from CPU to mode select circuit 304 of unit 17. When the "SFA/SFAT" signal indicates operation in an SFA mode, mode select circuit 304 sends mode selection signals to line counter 305 and frame counter 308, instructing counters 305 and 308 (and the other components of unit 17) to remodulate parallel data ("DATA") from memory unit 14 into SFA encoded parallel data, convert the SFA data into a stream of serial SFA data, and supply the serial SFA data stream to modulator unit 10. When the "SFA/SFAT" signal indicates operation in an SFAT mode, mode select circuit 304 instructs the components of unit 17 to remodulate the data from memory 14 into SFAT encoded parallel data, convert the SFAT data into a stream of serial SFAT data, and supply the serial SFAT data stream to unit 17. Similarly, in response to state of the "NTSC/PAL" signal, circuit 304 instructs the components of unit 17 to remodulate the data from memory 14 into either NTSC or PAL format.

Line counter 305, frame counter 308, and block memory address counter 307 of formatting unit 17 each receive a stabilized clock signal (preferably an 8 MHz or a 2 MHz clock signal) from phase locked loop oscillator unit 13. In the mode determined by the mode selection signal from unit 304, line counter 305 sends clock signals to line pattern ROM 306, and frame counter 308 sends clock signals to frame pattern ROM 309, enabling ROMs 306 and 309 to send appropriately timed mode selection signals ("SELECT" signals) to header RAM 300, parallel to serial conversion circuit 301, leader sync source 303, and block memory address counter 307. Block memory address counter 307 outputs address signals identifying blocks of data within a field of the active video areas of a video signal having format specified by mode selection unit 304. The address signals emerging from counter 307 are supplied to header RAM 300.

Parallel data from memory unit 14 is combined with leader sync information emerging from leader sync source 303, and is combined with header data emerging from header RAM 300. The header data is supplied to header RAM 300 from CPU 12, and is stored in RAM 300 until read out by the sequence of address signals received by RAM 300 from counter 307.

The parallel data from memory unit 14, header data, and leader sync information is combined together into an serial data stream having SFA or SFAT, and PAL or NTSC format (as determined by the SELECT signals output from ROM 306 and ROM 309). In a mode where a stream of serial SFA data is output from unit 301, such TTL serial data stream is sent to modulator 10 to be modulated in circuit 214. In a mode where a stream of serial data in SFAT format (but not duobinary encoded) is output from unit 301, such serial data stream is sent to duobinary conversion logic unit 302, to be converted in a conventional manner into two streams of SFAT data ("D0 SFAT DATA" and "D1 SFAT DATA") which may be summed together to generate a stream of duobinary encoded SFAT serial data. The signals output by logic unit 302 are supplied to modulator 10 to be summed and modulated in circuit 212.

Figure 13:
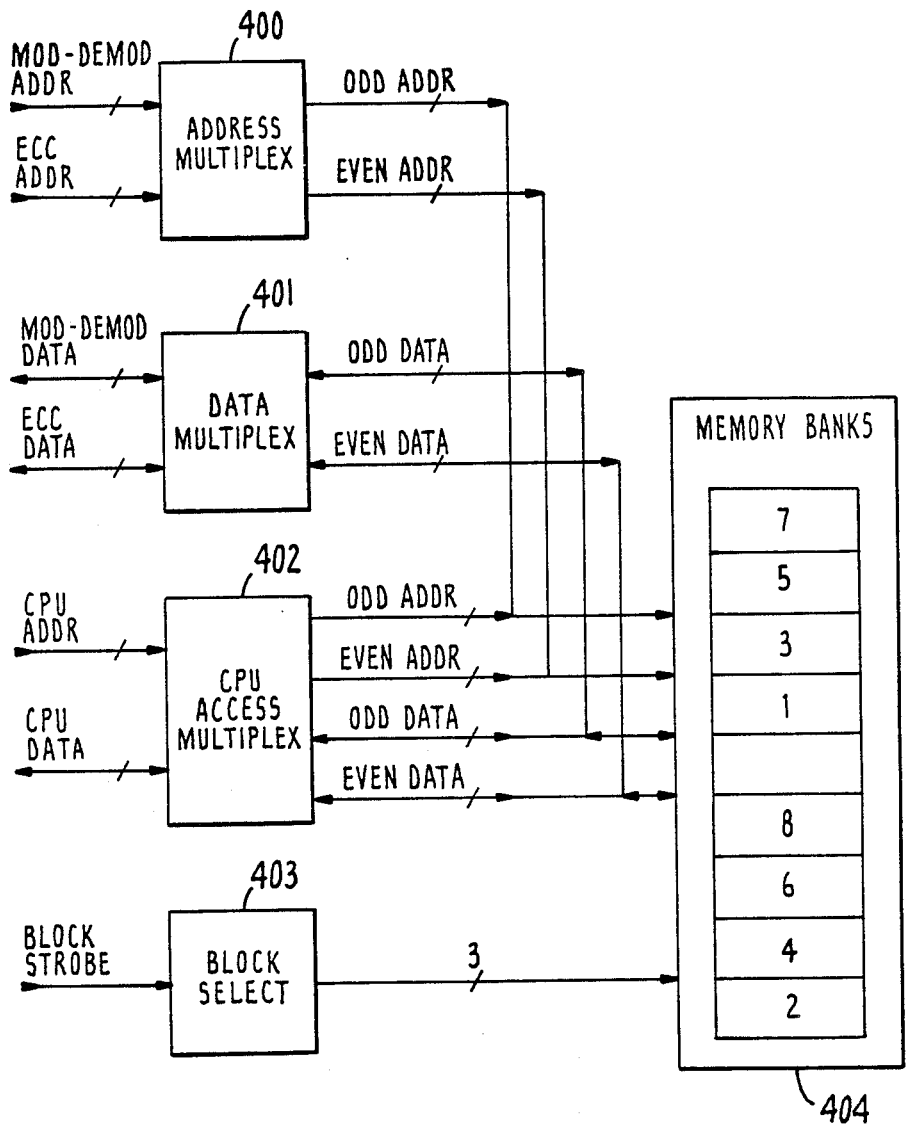
FIG. 13 is a block diagram of the memory board of FIG. 9.

FIG. 13 is a preferred embodiment of memory unit 14 shown in FIG. 9. The parallel data from demodulator 10 is received at data multiplexer unit 401. The data corresponding to even blocks is separated from the data corresponding to odd blocks in unit 401, and both the even and odd block data emerging from unit 401 may be written into memory bank unit 404. As shown in FIG. 13, unit 404 preferably includes eight memory banks. Data may be read from unit 404, multiplexed in unit 401, and then supplied either to ECC processor 15 (if the data has not yet been error corrected) or to modulator unit 10 (if it has already undergone error correction). Error corrected data from ECC processor 15 is also received at unit 401, separated in unit 401 into its even and odd block components, and supplied to memory unit 404.

A BLOCK STROBE signal (which indicates the start of each of the three blocks of data within each field of data, and will be described in more detail below with reference to FIG. 14) from demodulator unit 11 is supplied to block selection unit 403, and the parallel data stream output from unit 403 is supplied to memory unit 404.

Address signals from ECC processor 15 are separated into even and odd components in address multiplexer 400 and supplied to memory unit 404. Similarly, address signals from demodulator 11 are separated into even and odd components in address multiplexer 400 and supplied to memory unit 404.

CPU access multiplexer 402 receives data from CPU 12, separates the data into even and odd block components, and supplies the even and odd block components to memory unit 404. Even and odd block data read from memory unit 402 are multiplexed in unit 402, and supplied to CPU 12. Address signals from CPU 12 are separated into even and odd components in unit 402 and are supplied from unit 402 to memory unit 404.

Figure 14:
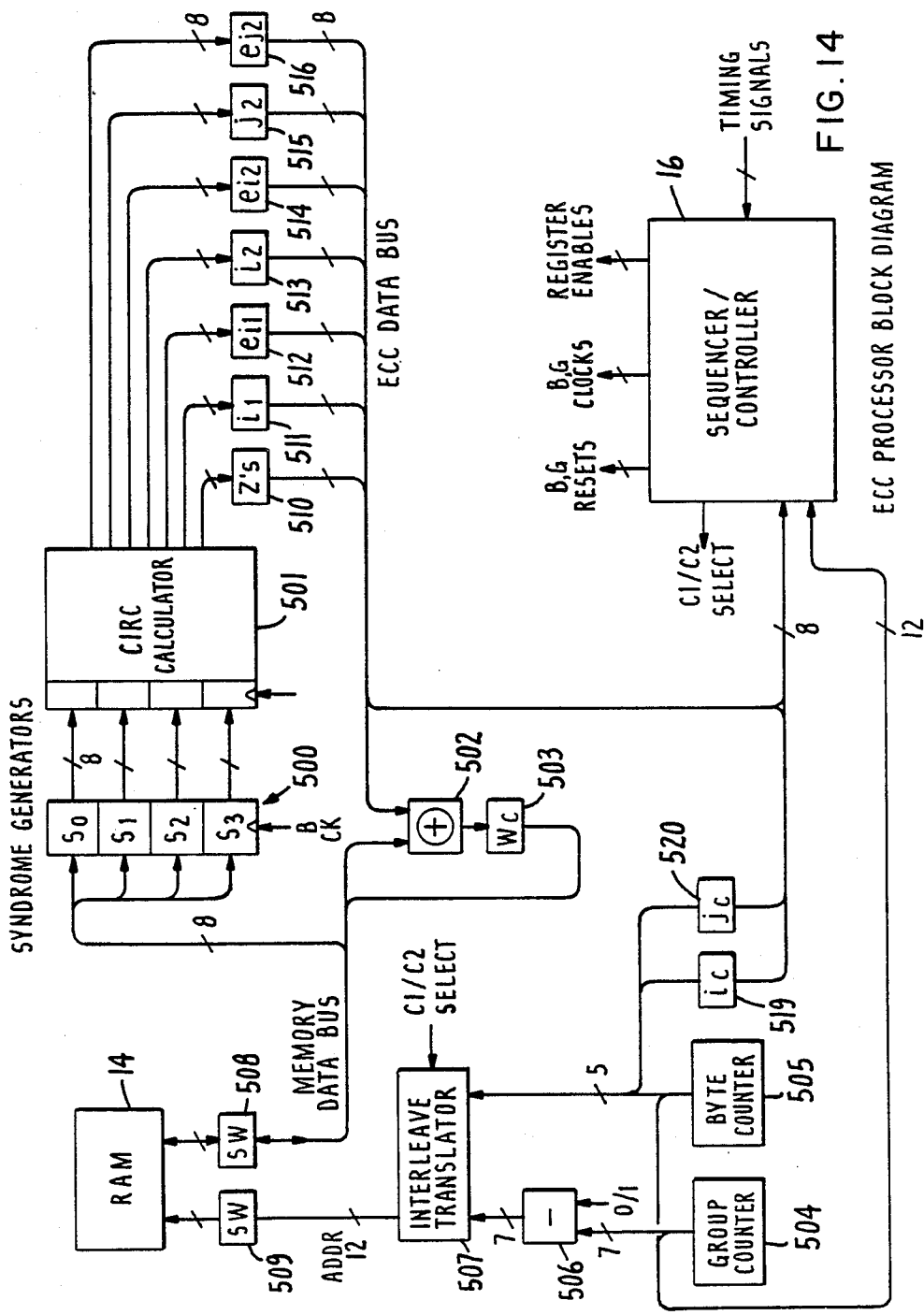
FIG. 14 is a block diagram of the error correction circuit of FIG. 9.
Figure 15:
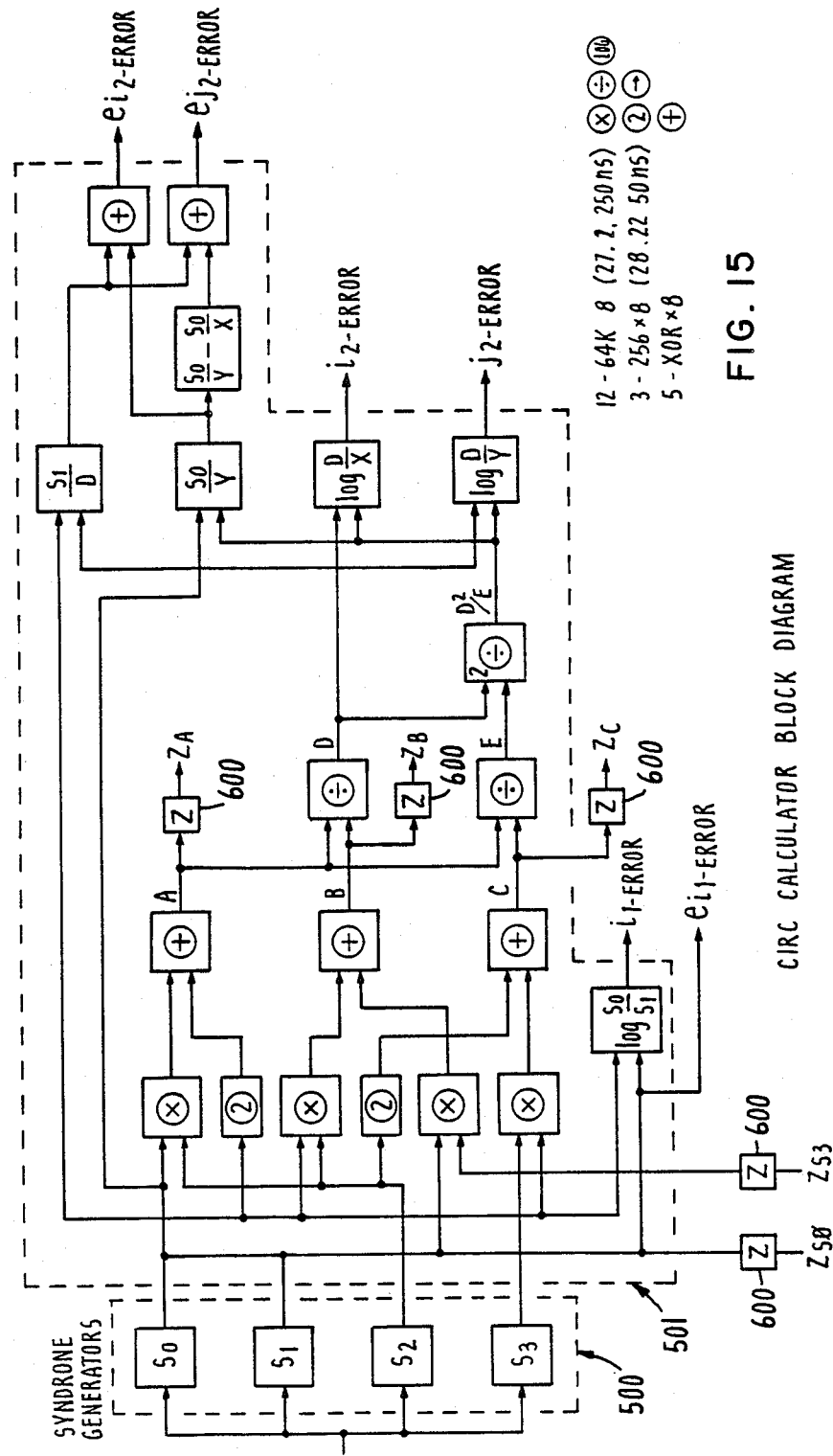
FIG. 15 is a block diagram of the CIRC calculator circuit of FIG. 14.
Figure 16:
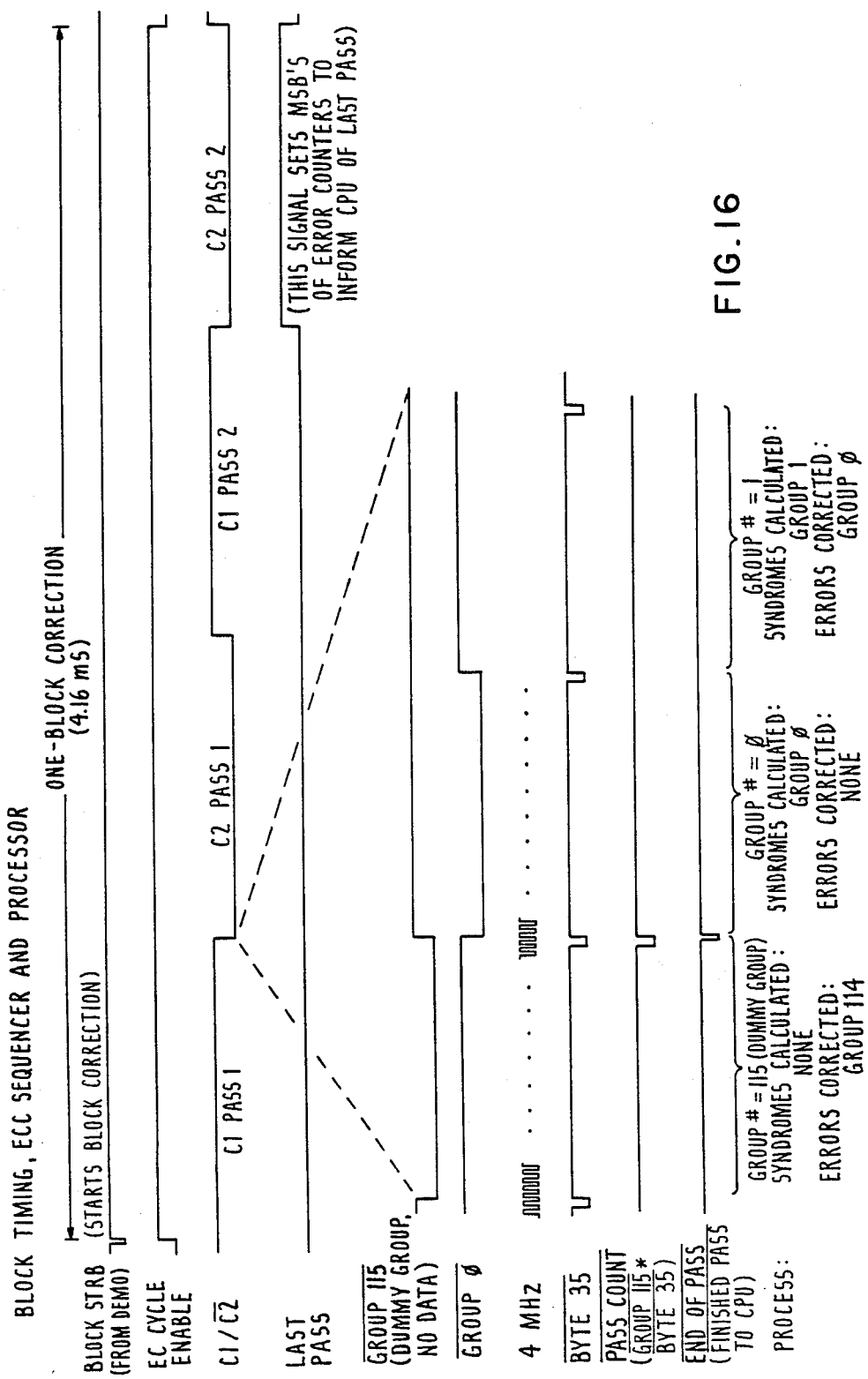
FIG. 16 is a timing diagram showing signals of the type employed in operation of the error correction circuit of FIG. 14.

FIG. 14 is a preferred embodiment of ECC processor 15 and ECC sequencer 16 of FIG. 9. FIG. 15 is a more detailed diagram of CIRC calculator circuit 501 of FIG. 14. Data from multiplexer 401 of memory unit 14 is received at register 508 and supplied to syndrome generator unit 500 and to modulo-two addition unit 502. The data in each SFAT frame is grouped into two fields, each field consisting of three data blocks. Each block consists of 115 groups and each group consists of thirty-two bytes. Each group of thirty-two bytes consists of twenty-four raw data bytes plus four ("inner" layer) C2 parity bytes and four ("outer" layer) C1 parity bytes. The four C2 bytes and the four C1 bytes are a part of the ECC2 code, while the twenty-four raw data bytes will typically be ECC1-encoded SFA data. In a preferred embodiment in which the ECC2 error code is a Cross Interleave Reed-Solomon code, in each layer of encoding, all 3689 (32×115) bytes in each block of encoded data are scrambled or "interleaved." Thus, a short duration dropout on the video tape will cause several groups to lose one byte each, rather than one group to lose several bytes.

For ECC computation, the eight-bit data values are treated as a Galois Field, which is a well-known finite, closed-ended number system. In this particular Galois Field, the addition of two values is performed by a bitwise "exclusive OR" operation. In correcting each group, four polynomial syndromes are computed from the data and are entered into ECC equations which determine the number of errors present and their locations. Either one or two errors per group can be corrected in the preferred embodiment to be described with reference to FIGS. 14 through 17.

To correct a group, ECC sequencer 16 addresses that group's data in RAM 14 with group counter 504 and byte counter 505. The addresses from counters 504 and 505 are supplied to mapping ROM 507, wherein they are translated into interleaved addresses.

Each of the 115 groups of data in a block undergoes four error correction "passes." Each pass is a thirty-six step operation. During the first thirty-two steps of a pass, each byte of group N is transferred into syndrome generators 500 while the syndromes of the previous group (group N−1) are processed by ECC calculator 501. In the last eight steps of a pass, the calculation results (error parameter signals $z_{S0}$, $z_{S3}$, $z_A$, $z_B$, $z_C$, $i_1$, $e_{i1}$, $i_2$, $e_{i2}$, $j_2$, and $e_{j2}$) supplied from unit 501 to shift registers 510 through 516 are used by the state machine of ECC sequencer 16 to address and correct up to two corrupted data bytes in the previous group (group N−1). The current group address is decremented by subtractor 506, the individual byte location is provided to register 519 or register 520, the correction value "e" is added in adder 502 to the data supplied thereto from the selected location in RAM 14, the sum (the corrected data) is stored in register 503, and this corrected data is written back into the same location in RAM 14.

Figure 17A:
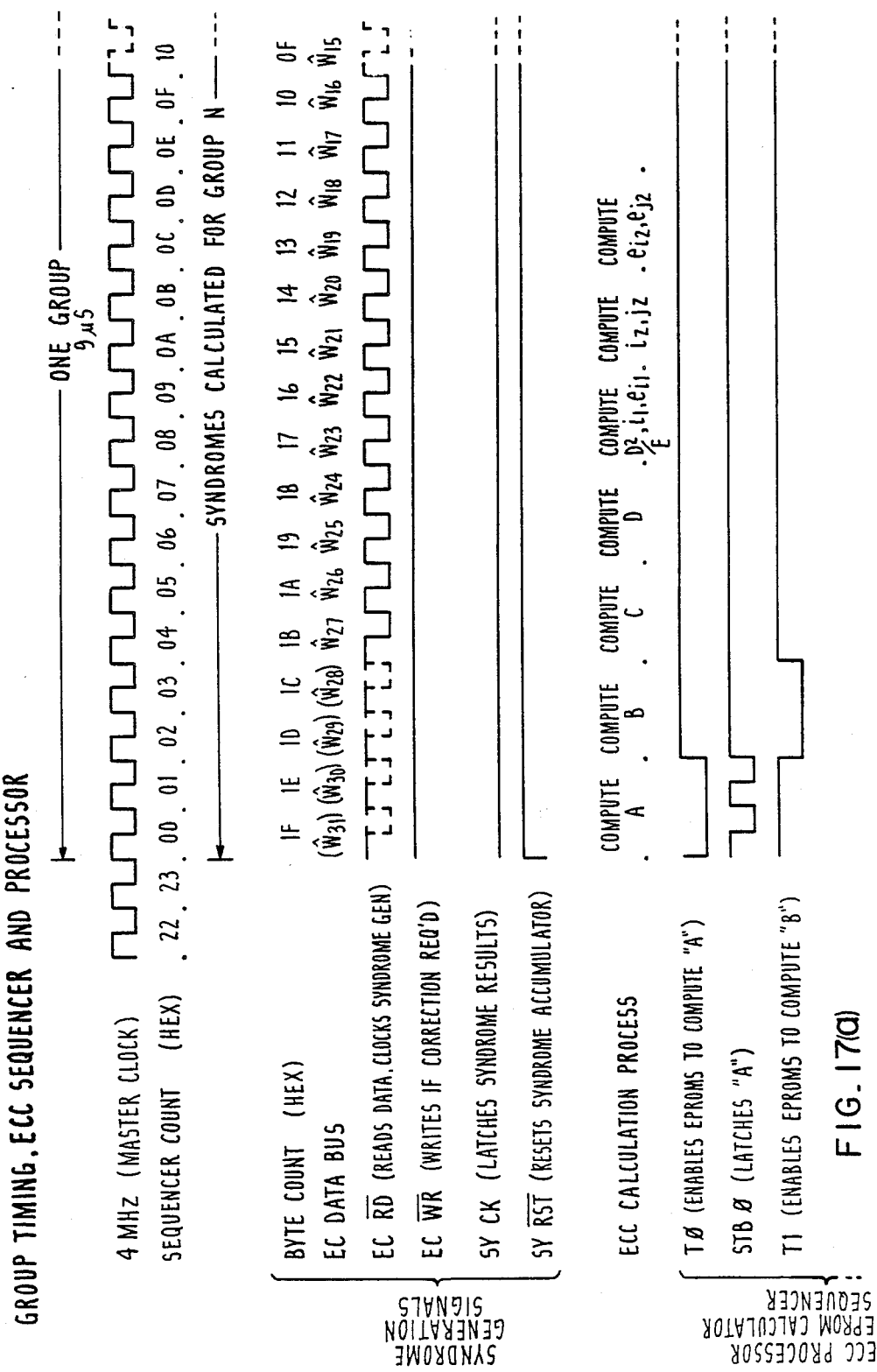
FIG. 17, comprised of FIGS. 17a–17d is a timing diagram showing signals of the type employed in operation of the error correction circuit of FIG. 14.
Figure 17B:
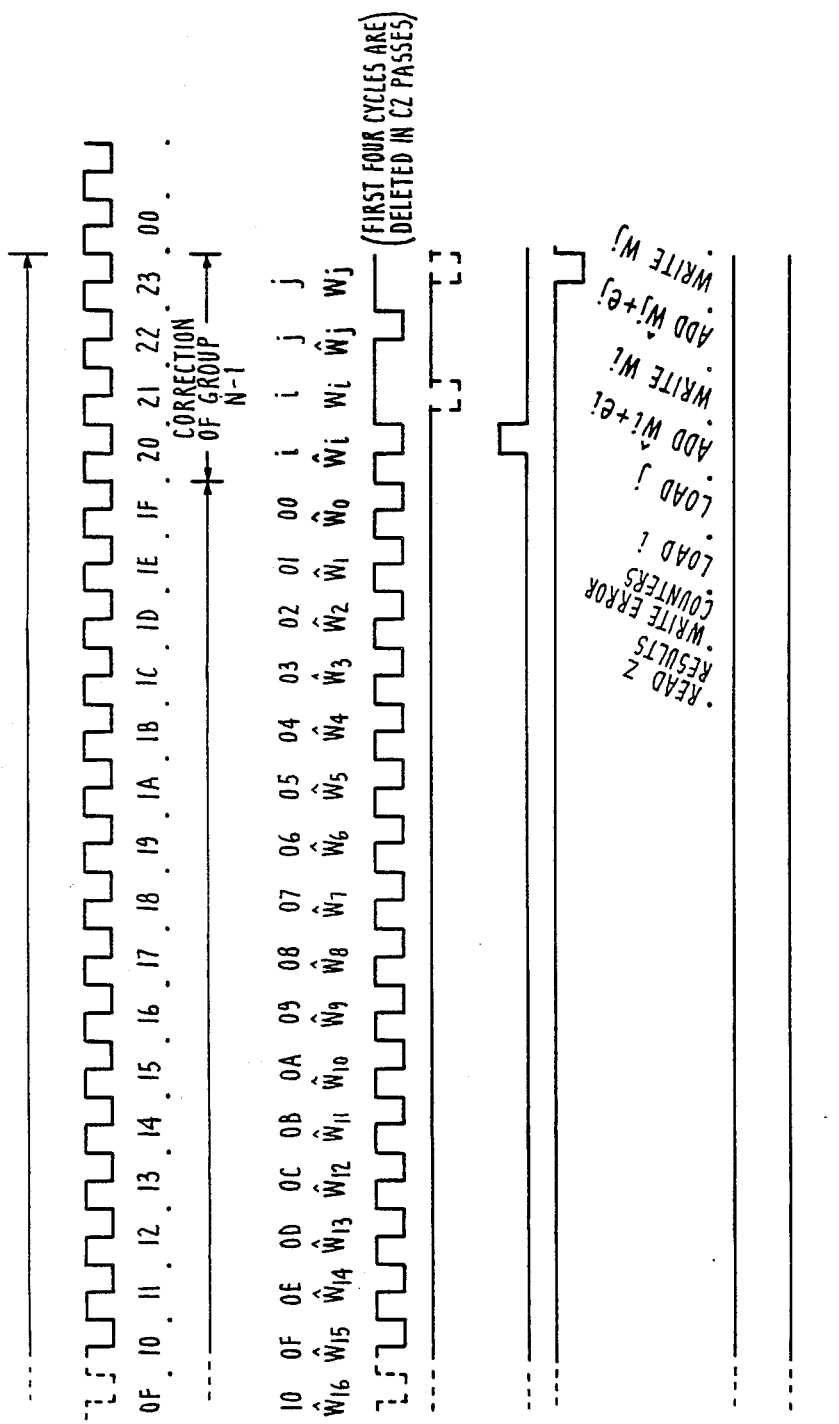
Figure 17C:
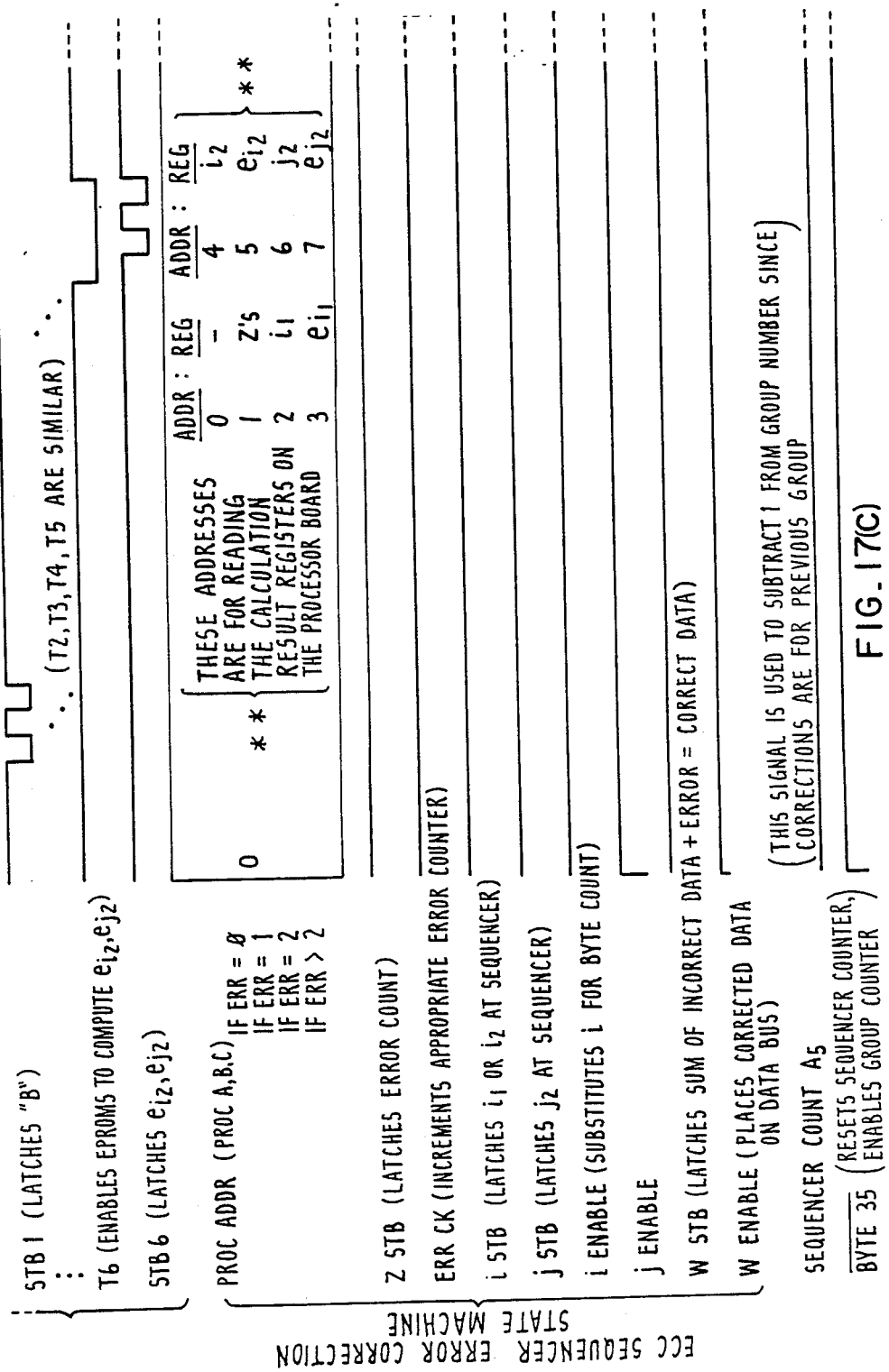

As indicated in timing diagram 16, each set of four passes for a group consists of a first pass ("C1 PASS 1") employing the outer layer C1, followed by a second pass ("C2 PASS 1") employing the inner layer C2, followed by a third pass ("C1 PASS 2") employing C1, followed by a fourth pass ("C2 PASS 2") employing C2. The C2 passes differ from the C1 passes in that each C2 pass processes only twenty-eight bytes rather than thirty-two bytes. The four C1 parity bytes are processed only in the C1 passes; not in the C2 passes. As shown in FIG. 17, the first four memory read cycles (EC RD) are not performed in the C2 passes. Also, a first interleaving table within ROM 507 is selected for C1 passes and a second interleaving table in ROM 507 is selected for C2 passes.

The syndromes $S_0$, $S_1$, $S_2$, and $S_3$ are calculated by hardware multiplier-accumulators within syndrome generator unit 500 in accordance with the following equations:

$$S_0 = \sum_{i=0}^{n-1} W_i,$$

$$S_1 = \sum_{i=0}^{n-1} a^i W_i,$$

$$S_2 = \sum_{i=0}^{n-1} a^{2i} W_i, \text{ and}$$

$$S_3 = \sum_{i=0}^{n-1} a^{3i} W_i,$$

where the a's are elements of the Galois Field GF($2^8$), $W_i$ are the received data, n=32 for the C1 passes, and n=28 for the C2 passes. These syndromes are supplied to ECC calculator 501.

FIG. 15 is a block diagram of ECC calculator 501, showing the Galois arithmetic elements for computing error parameter signals $z_{S0}$, $z_{S3}$, $z_A$, $z_B$, $z_C$, $i_1$, $e_{i1}$, $i_2$, $e_{i2}$, $j_2$, and $e_{j2}$. Each arithmetic element may be implemented in a conventional manner using ROMs. Parameter $i_1$ is the location of the corrupt byte, in the case of only one error, while parameters $i_2$ and $j_2$ are the locations in the case of two errors. Parameters $e_{i1}$, $e_{i2}$, and $e_{j2}$ are the correction values to be added to the corrupt bytes. Each of arithmetic elements 600 provides a single bit output indicating whether the input byte equals zero. The five bits ($z_{S0}$, $z_{S3}$, $z_A$, $z_B$, and $z_C$) output by elements 600 are collected in register 510 along with the outputs of three magnitude comparators (not shown) which sense whether the error locations ($i_1$, $i_2$, and $j_2$) are within the range of the group (i.e., whether they are less than 32 for a C1 pass, or less than 28 for a C2 pass). By reading register 510, the state machine of unit 16 can determine the number of errors according to the following rules: if $A=B=C=0$ and $S_0=S_3=0$ then there are no errors; if $A=B=C=0$ and $S_0$ or $S_3$ is not equal to 0 then there is one error; and if A or B or C is not equal to 0 then there are two errors (where $A=S_0S_2+(S_1)^2$, $B=S_1S_2+S_0S_3$, and $C=S_1S_3+(S_2)^2$). Register 510 is read on the twenty-ninth step of each pass (as indicated in FIG. 17), and the remaining seven steps in each pass depend on the number of errors found (i.e., one or two errors are corrected, while no action is taken if there are no errors or more than two errors).

The advantage of the four pass sequence for correcting each block is as follows. The first "outer" correction process (the first C1 pass) will correct some errors and may find some uncorrectable groups. The next pass (the first C2 pass) may render some of these groups correctable by the second C1 pass while finding some other groups uncorrectable using C2. The second C1 pass may in turn improve some of the groups so that they are correctable using C2 during the second C2 pass.

Each set of four passes is initiated by receipt of the BLOCK STROBE signal from demodulator 11, which signal indicates that a block of memory in RAM 14 has been filled with uncorrected data and is awaiting correction.

Sequencer 16 receives a 4 MHz clock signal from phase locked loop circuit 13. Such a 4 MHz clock allows the correction apparatus to complete all four passes on the block in memory within 4.16 ms (i.e., before the next block is filled).

The above description of a preferred embodiment of the invention is merely illustrative of the invention. It is contemplated that various changes in the details of construction and operation may be within the scope of the invention as defined by the appended claims.

What is claimed is:

1. A system for performing error correction on an SFAT format video signal having error encoded duobinary digital data in at least one of its active video areas, including:
    (a) a data memory unit;
    (b) means for extracting the duobinary digital data from the SFAT video signal;
    (c) means for receiving the extracted duobinary digital data from element (b), converting the extracted duobinary digital data into parallel digital data, and storing the parallel digital data in the memory unit;
    (d) an error correction unit coupled to the memory unit for receiving digital data stored in the memory unit, performing error correction on the received digital data, and returning the error corrected data to the memory unit; and
    (e) video signal generating means for receiving the error corrected data from the memory unit, and generating from the error corrected data an error corrected video signal having the error corrected data in at least one of its active video areas.

2. The system of claim 1, wherein the duobinary digital data is a duobinary digitized audio signal.

3. The system of claim 1, wherein the duobinary digital data is doubly error encoded using two error correction codes (ECC1 and ECC2), and the error correction unit employs the ECC2 error code to correct the digital data received from the memory unit.

4. The system of claim 3, wherein the error corrected video signal generating means is capable of operating in a first mode in which it generates an SFAT format video signal having the error corrected data in at least one of its active video areas, and in a second mode in which it generates an SFA format video signal having the error corrected data in at least one of its active video areas.

5. The system of claim 4, wherein the ECC2 error code is a cross interleave Reed-Solomon code.

6. The system of claim 1, wherein the error corrected video signal generating means is capable of generating an SFAT format video signal having the error corrected data in at least one of its active video areas.

7. The system of claim 1, wherein the error corrected video signal generating means is capable of generating an SFA format video signal having the error corrected data in at least one of its active video areas.

8. The system of claim 1, wherein the error corrected video signal generating means is capable of operating in a first mode in which it generates an SFAT format video signal having the error corrected data in at least one of its active video areas, and in a second mode in which it generates an SFA format video signal having the error corrected data in at least one of its active video areas.

9. The system of claim 1, also including:
    (f) means for generating a clock signal and supplying the clock signal to element (c), wherein the SFAT video signal includes a synchronization signal identifying the start of each line including said error encoded duobinary digital data, and wherein element (c) includes means for synchronizing the clock signal with each said synchronization pulse.

10. The system of claim 9, also including:
    (g) means for generating address signals from the synchronized clock signal, each said address signal identifying a portion of the parallel digital data; and
    (h) means for generating header signals from the address signals; and
    wherein element (e) includes means for combining the header signals with the error corrected data read out from the memory unit to generate said error corrected video signal.

11. The system of claim 1, also including:
    (i) means for determining the error rate of the SFAT format video signal and generating a report signal indicative of the detected error rate.

12. A method for performing error correction on an SFAT format video signal having error encoded duobinary digital data in at least one of its active video areas, including the steps of:
    (a) extracting the duobinary digital data from the SFAT format video signal;

(b) converting the extracted duobinary digital data into parallel digital data, and storing the parallel digital data in a memory unit;

(c) reading out digital data stored in the memory unit during step (b), performing error correction on the digital data read out from the memory unit, and returning the error corrected data to the memory unit; and (d) reading out the error corrected data from the memory unit and generating an error corrected video signal having said error corrected data in at least one of its active video areas.

13. The method of claim 13, also including the steps of:

(e) determining the error rate of the SFAT format video signal; and (f) generating a report signal indicative of the detected error rate.

14. The method of claim 13, wherein the SFAT video signal includes a synchronization signal identifying the start of each line including said error encoded duobinary digital data, also including the steps of:

(g) generating a clock signal, synchronizing the clock signal with each said synchronization pulse, and employing the synchronized clock signal to generate address signals each identifying a portion of the parallel digital data; and (h) employing the address signals to generate header signals, and combining the header signals with the error corrected data read out from the memory unit in step (d) to generate said error corrected video signal.

15. The method of claim 13, wherein the duobinary digital data is a duobinary encoded digitized audio signal.

16. The method of claim 13, wherein the duobinary digital data is doubly error encoded using two error correction codes (ECC1 and ECC2), and the ECC2 error code is employed in performing step (c).

17. The method of claim 16, wherein the error correction code ECC2 is a cross interleave Reed-Solomon code including an outer code layer C1 and an inner code layer C2, wherein the digital data stored in the memory unit is organized into blocks of data, and wherein step (c) includes four error correction passes on each block of data.

18. The method of claim 16, wherein the first of the four passes employs the C1 code, the second of the four passes employs the C2 code, the third of the four passes employs the C1 code, and the fourth of the four passes employs the C2 code.

19. The method of claim 16, in which the error corrected video signal has SFAT format.

20. The method of claim 16, in which the error corrected video signal has SFA format.

* * * * *